US011256313B2

United States Patent
O'Toole

(10) Patent No.: US 11,256,313 B2
(45) Date of Patent: Feb. 22, 2022

(54) METHODS AND SYSTEMS FOR DYNAMIC BACKUP POWER MANAGEMENT AT A POWER NODE

(71) Applicant: SCHNEIDER ELECTRIC IT CORPORATION, Foxboro, MA (US)

(72) Inventor: Peter J. O'Toole, Galway (IE)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 286 days.

(21) Appl. No.: 16/106,823

(22) Filed: Aug. 21, 2018

(65) Prior Publication Data

US 2019/0107877 A1    Apr. 11, 2019

Related U.S. Application Data

(63) Continuation-in-part of application No. 15/728,646, filed on Oct. 10, 2017.

(51) Int. Cl.
| | |
|---|---|
| G06F 1/28 | (2006.01) |
| G06F 9/50 | (2006.01) |
| H04L 41/08 | (2022.01) |
| H04L 12/12 | (2006.01) |
| G06F 1/3212 | (2019.01) |
| H04L 12/24 | (2006.01) |
| H04L 12/26 | (2006.01) |
| H04L 43/028 | (2022.01) |
| H04L 43/0882 | (2022.01) |

(52) U.S. Cl.
CPC .............. *G06F 1/28* (2013.01); *G06F 1/3212* (2013.01); *G06F 9/5094* (2013.01); *H04L 12/12* (2013.01); *H04L 41/08* (2013.01); *H04L 43/028* (2013.01); *H04L 43/0882* (2013.01)

(58) Field of Classification Search
CPC ........ G06F 1/28; G06F 1/3212; G06F 9/5094; G06F 1/3278; G06F 1/3206; G06F 1/30; G06F 1/263; H04L 12/12; H04L 41/08; H04L 43/0882; H04L 43/028; H04L 12/10
See application file for complete search history.

(56) References Cited

U.S. PATENT DOCUMENTS

| | | | |
|---|---|---|---|
| 6,064,857 | A | 5/2000 | Wiedeman et al. |
| 10,048,996 | B1 | 8/2018 | Bell et al. |
| 2004/0075343 | A1 | 4/2004 | Wareham et al. |

(Continued)

FOREIGN PATENT DOCUMENTS

| | | |
|---|---|---|
| JP | H0621954 A | 1/1994 |
| KR | 101180164 B1 | 9/2012 |
| TW | 201908917 A | 3/2019 |

OTHER PUBLICATIONS

Extended European Search Report from corresponding European Application No. 18199534.1 dated Oct. 23, 2019.

(Continued)

*Primary Examiner* — Robert L Deberadinis
(74) *Attorney, Agent, or Firm* — Lando & Anastasi, LLP

(57) ABSTRACT

Methods and systems are described for power state management. A critical usage window may be configured at a gateway node. A change in a power state of the gateway node may be detected, at an interface, during the critical usage window. The power state of the gateway node may be adjusted via the interface for a set duration using a backup power node.

18 Claims, 10 Drawing Sheets

(56) References Cited

U.S. PATENT DOCUMENTS

| | | |
|---|---|---|
| 2005/0229016 A1* | 10/2005 | Addy .................... G06F 1/30 |
| | | 713/300 |
| 2006/0028347 A1 | 2/2006 | Ziejewski et al. |
| 2007/0002771 A1 | 1/2007 | Berkman et al. |
| 2007/0135971 A1 | 6/2007 | Andarawis et al. |
| 2007/0153798 A1* | 7/2007 | Krstulich ............. H04L 47/825 |
| | | 370/392 |
| 2009/0013210 A1 | 1/2009 | McIntosh et al. |
| 2009/0193268 A1* | 7/2009 | Kreiner ............... G06F 11/3062 |
| | | 713/300 |
| 2010/0001586 A1 | 1/2010 | Bernard et al. |
| 2010/0016034 A1 | 1/2010 | Lindqvist et al. |
| 2010/0185882 A1 | 7/2010 | Arnold et al. |
| 2010/0235490 A1 | 9/2010 | Nasnas |
| 2010/0238003 A1 | 9/2010 | Chan et al. |
| 2012/0330804 A1* | 12/2012 | Morrill ................ H04M 15/80 |
| | | 705/34 |
| 2013/0173939 A1* | 7/2013 | Peto .................... G06F 1/266 |
| | | 713/300 |
| 2013/0304268 A1 | 11/2013 | Pernia et al. |
| 2014/0082393 A1 | 3/2014 | Liang |
| 2014/0370843 A1 | 12/2014 | Cama et al. |
| 2014/0380072 A1 | 12/2014 | Lee |
| 2015/0067377 A1 | 3/2015 | Park et al. |
| 2016/0294197 A1 | 10/2016 | Thompson et al. |
| 2017/0093625 A1 | 3/2017 | Pera et al. |
| 2019/0033938 A1 | 1/2019 | Ou Yang et al. |
| 2019/0107877 A1 | 4/2019 | O'Toole |

OTHER PUBLICATIONS

Extended European Search Report from corresponding European Application No. 19192644.3 dated Dec. 12, 2019.

\* cited by examiner

METHODS AND SYSTEMS FOR DYNAMIC BACKUP POWER MANAGEMENT AT A POWER NODE

TECHNICAL FIELD

The present disclosure is generally directed to backup power management. More particularly, aspects of the present disclosure relate to methods and systems for backup power management at, for example, an uninterruptible power supply (UPS) during blackout or brownout conditions.

INTRODUCTION

The use of power devices or nodes, such as an UPS, to provide regulated, uninterrupted power for sensitive and/or critical loads (e.g., computer systems and/or other data processing systems) when an input power source such as a utility main fails, is known. Many different UPS products are available, including those identified under the trade name SMART-UPS from APC by Schneider Electric, Inc. of West Kingston, R.I. Most UPS' use batteries (or other power sources such as electronic circuitry, diesel generators or flywheels, etc.) to provide backup power to critical loads during blackout or brownout conditions (e.g., a critical window). But, because the runtime capacity of an UPS battery is finite and varies tremendously (e.g., due to changes in temperature, battery age, loading, etc.), in some instances, the runtime capacity of the UPS battery may expire during the critical window, suspending backup power to critical loads. Thus, it may be desirable to use, for example, wired and/or wireless technologies and/or computing (coupled with different internet protocols) to enable smart, backup power management at the UPS during these and other conditions.

SUMMARY

The present disclosure solves one or more of the above-mentioned problems and/or demonstrates one or more of the above-mentioned desirable features. Other features and/or advantages may become apparent from the description that follows.

In accordance with at least one exemplary embodiment, the present disclosure contemplates a method for power management at a power device or node (e.g., an UPS) that includes enabling a first mode of operation at an access point (e.g., a router and/or other gateway node) connected to the power node. The method may further include monitoring a power state of the power node at a user interface and isolating, at the user interface, network devices connected to the access point using a first parameter. When the monitored power state of the power node meets a first criteria, an end-user can disconnect, via the user interface, the isolated network devices for a set duration.

In accordance with at least another exemplary embodiment, the present disclosure contemplates a method for automatic power state management at an access point that includes configuring a critical usage window at the access point. The method may further include detecting, at an interface, a change in a power state of the access point during the critical usage window. After detecting the change, the power state of the access point can be adjusted for a set duration (e.g., a default time duration), at the interface, using a backup power device or node. The set duration correlates to network usage at variable time instants during the critical usage window.

In accordance with another exemplary embodiment, the present disclosure contemplates a method where a priority for groups of network devices is at least one of a low priority, medium priority, high priority, redundant, critical, and/or non-critical. The method may further contemplate the power state is at least one of utility mains available, utility mains unavailable, and/or utility mains unreliable.

In accordance with another exemplary embodiment, the present disclosure contemplates a method for reducing power expenditure at a power device or node that includes querying data associated with network devices (e.g., connected to the network at an access point) at set time intervals. The method may further include assigning numerical gradients or tags to the network devices based on the queried data and detecting a change in the power state of the access point. When one or more numerical gradients or tags assigned to the network devices meets a criteria, the power node can adjust, at an interface, the power state of the access point.

In accordance with at least another exemplary embodiment, the present disclosure contemplates a network system including an access point and a power device or node. The power device or node collects network data associated with network devices at set intervals, determines a power state of the access point, and provides backup power to the access point when the power state meets a first criteria and the network data meets a second criteria.

In accordance with another exemplary embodiment, the present disclosure contemplates a network system including a user interface in communication with an access point and a power device or node. The power device or node may be configured to: request a network usage status for network devices connected to the access point; classify the network devices based on the network usage status; and, when a change in a power state of the access point is detected, instruct the access point, at the user interface, to suspend power to network devices classified as non-critical for a set duration.

In accordance with at least another exemplary embodiment, the present disclosure contemplates a network system including an access point, a power device or node connected to the access point, and a user interface. The user interface may be configured to query a network usage status at the access point, detect a change in a power state of the access point, and, based on the queried network usage status, instruct the power node to provide backup power to the access point.

Additional objects and advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the invention, as disclosed or claimed. The claims should be entitled to their full breadth of scope, including equivalents.

BRIEF DESCRIPTION OF THE DRAWINGS

The present disclosure can be understood from the following detailed description either alone or together with the accompanying drawings. The drawings are included to provide a further understanding of the present disclosure, and are incorporated in and constitute a part of this specification. The drawings, which are incorporated in and constitute a part of this specification, illustrate one or more embodiments of the present disclosure and, together with the description, explain certain principles and operation. In the drawings.

DETAILED DESCRIPTION

This description and the accompanying drawings illustrate exemplary embodiments and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitations of items in a list is not to the exclusion of other like items that can be substituted or added to the listed items.

In accordance with various exemplary embodiments, the present disclosure contemplates methods and systems for smart, power state management at a network node (e.g., an UPS, router, metered and/or unmetered Power Distribution Unit (PDU) or Mains Distribution Unit (MDU), etc.). For example, during a critical window (e.g., during blackout or brownout conditions), a power state of the network node may be monitored at an interface. Various exemplary embodiments may isolate loads at the network node and/or assign numerical gradients or tags to the loads that specify a priority of the loads based on, for example, queried data. On detection of a change in power state of the network node, and depending on a current operating mode, the network node may suspend power to or otherwise shed isolated and/or tagged loads. In various exemplary embodiments, the network node may provide (or enable) machine-learning that predicts loads at the network node during the critical window and preemptively suspends power to or otherwise sheds, for example, isolated and/or tagged loads for a set duration. This enables smart, power state management at the network node by conserving power for sensitive and/or critical loads during the critical window.

Figure 1A:
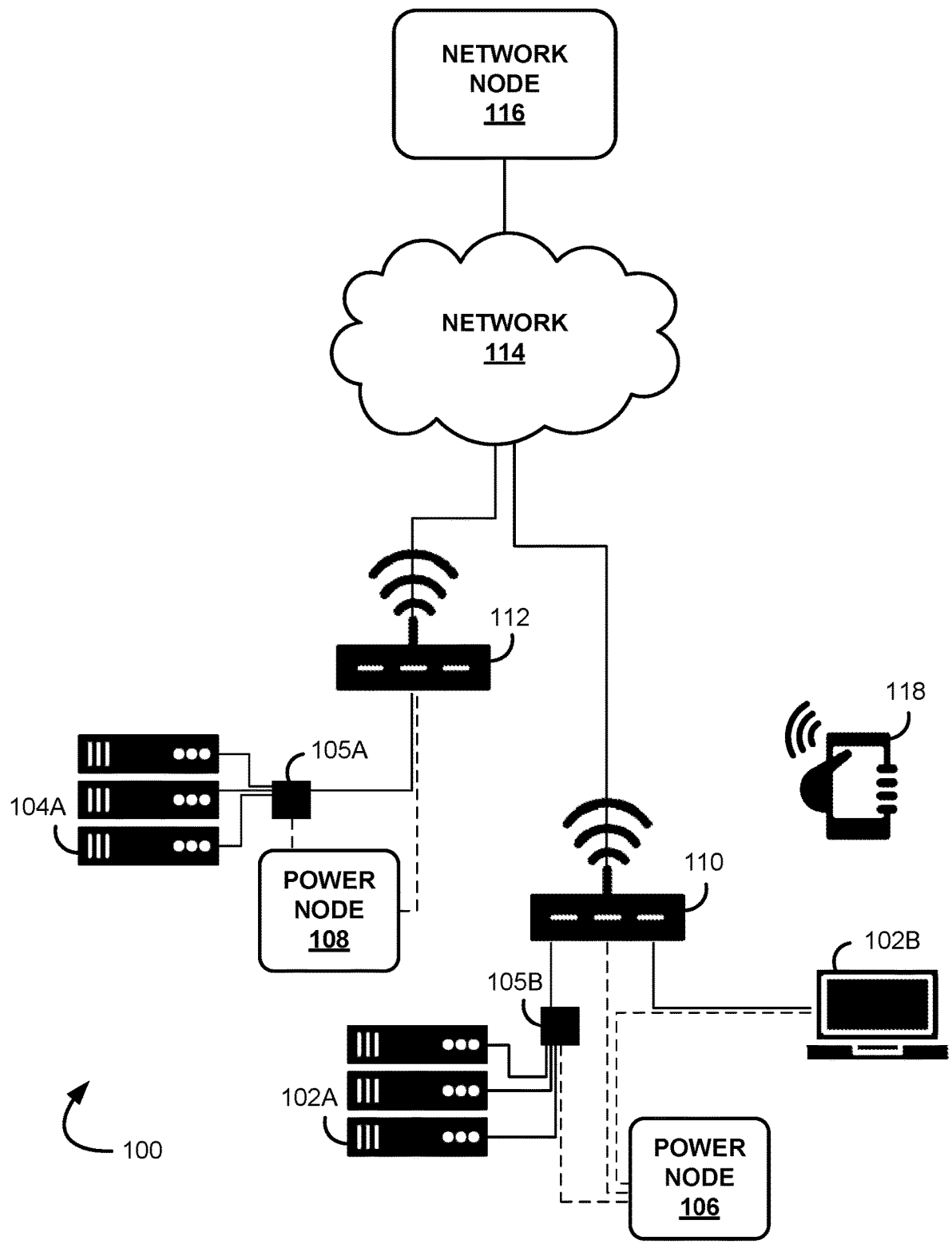
FIG. 1A is a schematic view of an exemplary network system configured to enable power state management at a network node in accordance with an exemplary embodiment of the present disclosure.

With reference now to FIG. 1A, a schematic view of an exemplary network system 100 is depicted. System 100 includes network devices 102A, 102B, 104A, 118 (e.g., a datacenter, server farm, remote terminal unit, computing platform, and/or other internet access device, etc.), which can use a local area network (LAN), wide area network (WAN), or internetwork (including the Internet) to communicate over communication network 114. The network devices 102A, 102B, 104A, 118 can be coupled to or otherwise connected to, for example, metered and/or unmetered Power Distribution Units (PDUs) and/or Mains Distribution Units (MDUs) 105A, 105B. System 100 further includes power nodes 106, 108, access points 110, 112, and network node 116. It is noted that the system components in FIG. 1A are not shown in any particular positioning and can be arranged as desired.

System 100 enables smart, power state management at power nodes 106, 108 by monitoring, at a processing node and/or other cloud-based or external control module (e.g. software agent) configured to communicate with system 100, a power state (e.g., utility mains available, utility mains unavailable, utility mains unreliable, on, off, idle, active, etc.) of an input power source (e.g., utility mains), PDU/MDUs 105A, 105B, power nodes 106, 108, and/or access points 110, 112 and, when appropriate (e.g., after a predetermined wait time period), suspending power to, for example, isolated and/or tagged network loads (e.g., network devices 102A, 102B, 104A, 118, PDU/MDUs 105A, 105B, power nodes 106, 108, and/or access points 110, 112) for a set duration (e.g., milliseconds, seconds, minutes, hours, days, etc.).

Communication network 114 can be a wired and/or wireless network that uses, for example, physical and/or wireless data links to carry network data among (or between), for example, network devices 102A, 102B, 104A, 118, PDU/MDUs 105A, 105B, power nodes 106, 108, access points 110, 112, and/or network node 116. Network 114 can support voice, push-to-talk (PTT), broadcast video, and/or network data communications by network devices 102A, 102B, 104A, 118, PDU/MDUs 105A, 105B, power nodes 106, 108, access points 110, 112, and/or network node 116. Wireless network protocols can include, for example, MBMS, CDMA, 1×RTT, GSM, UMTS, HSPA, EV-DO, EV-DO rev.

A, 3GPP LTE, WiMAX, NFC, Bluetooth, Zigbee, 6LoW-PAN, etc. Wired network protocols can include, for example, Ethernet, Fast Ethernet, Gigabit Ethernet, Local Talk (such as Carrier Sense Multiple Access with collision Avoidance), Token Ring, FDDI, ATM, USB, etc.

Network node 116 can also use, for example, physical and/or wireless data links to carry network data among (or between), for example, network devices 102A, 102B, 104A, 118, PDU/MDUs 105A, 105B, power nodes 106, 108, access points 110, 112, and/or network node 116. Network node 116 can be a standalone computing device, computing system, or network component. For example, network node 116 may include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc.

Figure 1B:
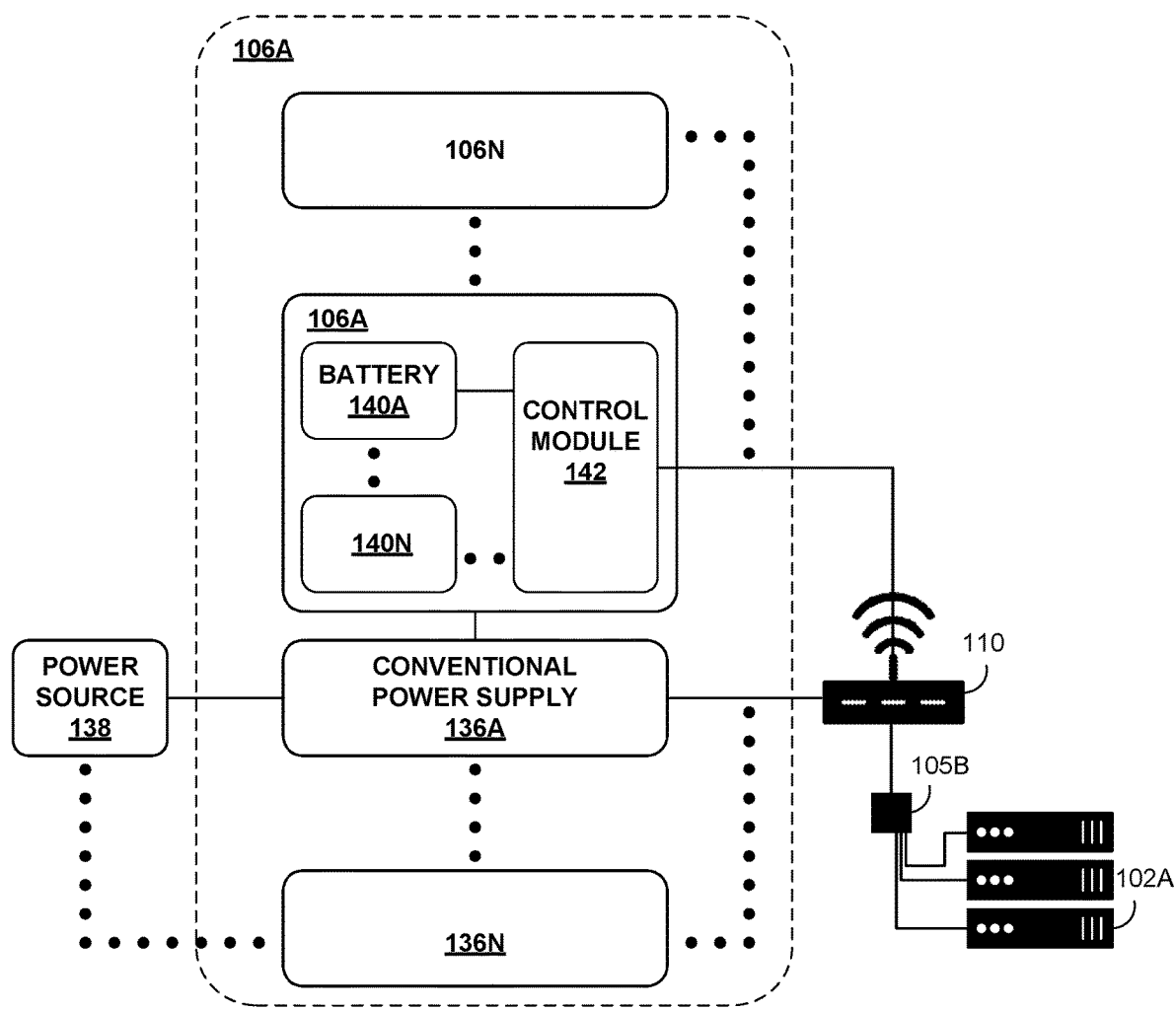
FIG. 1B is a schematic diagram that shows a portion of the exemplary network system of FIG. 1A in accordance with an exemplary embodiment of the present disclosure.

With reference now to FIG. 1B, a schematic view that shows a portion of the exemplary network system 100 is depicted. As noted above, system 100 is used to enable smart, power state management at, for example, power nodes 106, 108. In one exemplary embodiment, power node 106 can include UPS modules 106A-106N and/or conventional power supply modules 136A-136N. The UPS modules 106A-106N can be coupled (electrically or otherwise) to conventional power supply modules 136A-136N. Further, UPS modules 106A-106N and/or conventional power supply modules 136A-136N can be coupled to or otherwise connected to PDU/MDU 105B and/or access point 110, which may be configured as a router and/or other gateway node. As shown in FIG. 1B, conventional power supply modules 136A-136N can be coupled to an input power source 138 (e.g., an external, alternating-current (AC) power source) at, for example, an input port or interface. AC voltage received at input power source 138 can be converted into a direct-current (DC) voltage at the conventional power supply modules 136A-136N to provide power to PDU/MDU 105B and/or access point 110 and, when necessary, to provide charging energy to battery modules 140A-140N (or other power sources such as electronic circuitry, diesel generators or flywheels, etc.) of UPS modules 106A-106N.

As noted above, UPS modules 106A-106N can be coupled to conventional power supply modules 136A-136N. UPS modules 106A-106N include battery modules 140A-140N, which can include rechargeable type batteries such as lead-acid and/or lithium-ion batteries, etc., and control module 142. Control module 142 contains electrical and/or electronic circuits, which may be used to control functions of the battery modules 140A-140N of UPS modules' 106A-106N. For example, control module 142 can use the electrical and/or electronic circuits and integrated circuit components to detect a change in and/or a current power state (e.g., utility mains available, utility mains unavailable, utility mains unreliable, on, off, idle, or active, etc.) of, for example, UPS modules 106A-106N, conventional power supply modules 136A-136N, PDU/MDU 105B, and/or access point 110. Based on the change in and/or current power state, control module 142 can choose to control functions of UPS modules 106A-106N such as, for example, charging battery modules 140A-140N, discharging battery modules 140A-140N, switching-off (or shutting-down) battery modules 140A-140N, and/or causing battery modules 140A-140N to enter an idle (or standby) mode.

Control module 142 can receive signals from input power source 138, conventional power supply modules 136A-136N, PDU/MDU 105B, and/or access point 110. Control module 142 can use the signals to detect loss of input power source 138, conventional power supply modules 136A-136N, PDU/MDU 105B, and/or access point 110. When loss of input power source 138, conventional power supply modules 136A-136N, PDU/MDU 105B, and/or access point 110 is detected, control module 142 can engage and/or control one or more functions of UPS modules 106A-106N. For example, in one embodiment, control module 142 can engage a discharging function of battery modules 140A-140N to provide regulated, uninterrupted power to PDU/MDU 105B and/or access point 110. Further, control module 142 can regulate voltage level(s) used to charge battery modules 140A-140N and/or to discharge power to PDU/MDU 105B and/or access point 110. Multiple UPS modules 106A-106N, battery modules 140A-140N, and/or conventional power supply modules 136A-136N can be installed at power node 106 to increase charge capacity, power output capacity, and/or to provide hardware redundancy.

With reference now to FIGS. 1A and 1B, as noted above, access points 110, 112 can be configured as wired and/or wireless routers and/or other gateway nodes. Access points 110, 112 can facilitate receipt, routing, and/or forwarding of network data. Access points 110, 112 (or other network nodes such as, for example, network devices 102A, 102B, 104A, 118, PDU/MDUs 105A, 105B, power nodes 106, 108, and/or network node 116) can query network data at set time intervals (e.g., milliseconds, seconds, minutes, hours, days, etc.). In one embodiment, UPS modules 106, 108 and/or access points 110, 112 working in conjunction with PDU/MDUs 105A, 105B can isolate the network data (e.g., by performing deep packet inspection of network protocols, network data traffic, UPS module outlet setup, PDU/MDU outlet setup, etc., associated with, for example, network devices 102A, 102B, 104A, 118, PDU/MDUs 105A, 105B, power nodes 106, 108, and/or access points 110, 112), associate the isolated network data with, for example, network loads, and assign tags (e.g., low priority, medium priority, high priority, redundant, critical, non-critical, etc.) to the isolated network data and/or associated network loads based on the query. In another exemplary embodiment, using machine-learning, access points 110, 112 (or other network nodes such as, for example, network devices 102A, 102B, 104A, 118, PDU/MDUs 105A, 1056, power nodes 106, 108, network node 116, and/or at other external networks) can generate (or assign) numerical gradients for/to network devices 102A, 102B, 104A, 118, PDU/MDUs 105A, 105B, power nodes 106, 108, and/or access points 110, 112 using the assigned tags. Criticality of and/or redundancy of, for example, the numerical gradients can be calculated as a probability and, when the probability meets or exceeds a threshold probability, can trigger suspension of power to the network devices 102A, 102B, 104A, 118, PDU/MDUs 105A, 105B, power nodes 106, 108, and/or access points 110, 112.

On detection of a change in and/or a current power state of UPS modules 106, 108 (e.g., including UPS modules 106A-106N, battery modules 140A-140N, control module 142, and/or conventional power supply modules 136A-136N), PDU/MDUs 105A, 105B, and/or access point 110, 112 and, depending on a current operating mode (e.g., manual or automatic) and/or calculated probability that meets or exceeds the probability threshold, network devices 102A, 102B, 104A, 118, PDU/MDUs 105A, 105B, power nodes 106, 108, and/or access points 110, 112 can trigger suspension of power to the isolated and/or tagged network data and/or network loads for a set duration (e.g., milliseconds, seconds, minutes, hours, days, etc.).

Figure 9:
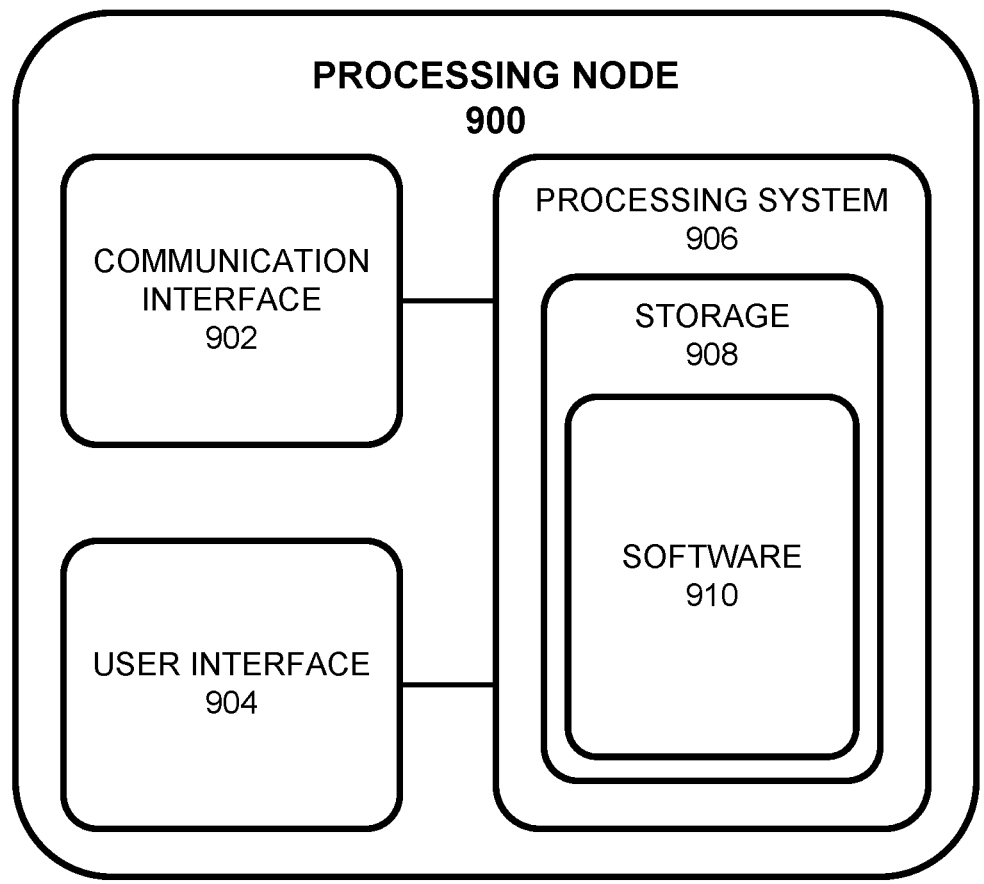
FIG. 9 is an exemplary processing node.

For example, in one embodiment, network devices 102A, 102B, 104A, 118, PDU/MDUs 105A, 105B, power nodes 106, 108, and/or access points 110, 112 can be in integrated with (e.g., at a control module) a communication interface 902, user interface 904, and/or processing system 906 (as shown in FIG. 9). The interfaces 902, 904 and/or processing system 906 can receive input signals that, for example, instruct adjustment, change, and/or control of a current power state of network devices 102A, 102B, 104A, 118, PDU/MDUs 105A, 105B, power nodes 106, 108 (e.g., including UPS modules 106A-106N, battery modules 140A-140N, control module 142, and/or conventional power supply modules 136A-136N), and/or access points 110, 112. The interfaces 902, 904 and/or processing system 906 can further generate control signals to adjust, change, and/or control the current power state of network devices 102A, 102B, 104A, 118, PDU/MDUs 105A, 105B, power nodes 106, 108 (e.g., including UPS modules 106A-106N, battery modules 140A-140N, control module 142, and/or conventional power supply modules 136A-136N), and/or access points 110, 112. The interfaces 902, 904 and/or processing system 906 can generate output signals to provide haptic, tactile, and/or visual feedback of the adjusted, changed, and/or controlled power state to an end-user, network devices 102A, 102B, 104A, 118, PDU/MDUs 105A, 105B, power nodes 106, 108, and/or access points 110, 112. Using the interfaces 902, 904 and/or processing system 906, network devices 902A, 102B, 104A, 118, PDU/MDUs 105A, 105B, power nodes 106, 108, and/or access points 110, 112 can suspend power to the isolated and/or tagged network data and/or network loads using a switching-off (or shutting-down) function of battery modules 140A-140N and/or the idle (or standby) mode of battery modules 140A-140N and/or can instruct PDU/MDUs 105A, 105B, UPS modules 106, 108, and/or access points 110, 112 to "drop" the isolated and/or tagged network data and/or network loads.

Figure 2:
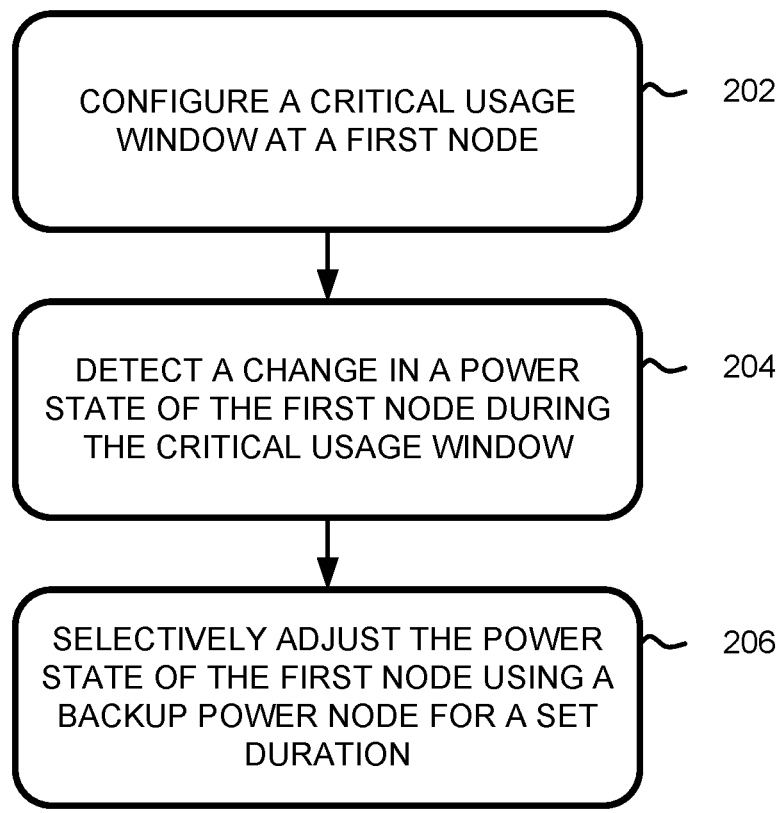
FIG. 2 is a flow diagram depicting a method for power state management at a network node in accordance with an exemplary embodiment of the present disclosure.

With reference now to FIG. 2, a flow diagram of an exemplary method for power state management at a network node is depicted. The method can be implemented in the exemplary network system 100 shown in FIGS. 1A and 1B, or with any suitable network system. The method for power state management shown in FIG. 2 is discussed with reference to the network system 100 shown in FIGS. 1A and 1B. In addition, while FIG. 2 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At step 202, a critical usage window may be configured at a first node. For example, a machine-learning mechanism can be enabled at network devices 102A, 102B, 104A, 118, PDU/MDUs 105A, 105B, power nodes 106, 108 (e.g., including UPS modules 106A-106N, battery modules 140A-140N, control module 142, and/or conventional power supply modules 136A-136N), access points 110, 112, and/or network node 116 and used to correlate network usage at variable time instants for each of network devices 102A, 102B, 104A, 118, PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112. Using the correlations, the machine-learning mechanism can generate unique network usage models for each of network devices 102A, 102B, 104A, 118, PDU/MDUs 105A, 105B (e.g., including PDU/MDU outlets), power nodes 106, 108, and/or access points 110, 112 at set time intervals. In addition, the machine-learning mechanism can generate a basic heuristic (e.g. based on an aggregation of all of the unique network usage models) and, using the generated basic heuristic, can further generate a base network usage model (or pattern) for network devices 102A, 102B, 104A, 118, PDU/MDUs 105A, 105B (e.g., including PDU/MDU outlets), power nodes 106, 108, and/or access points 110, 112 such as, for example, a base network usage model that is "offline" from 1:00 a.m. until 5:00 a.m. The base network usage model can be updated for each of network devices 102A, 1026, 104A, 118, PDU/MDUs 105A, 105B (e.g., including PDU/MDU outlets), power nodes 106, 108, and/or access points 110, 112 using its generated unique network usage model. Critical usage windows can be dynamically configured for each network device 102A, 1026, 104A, 118, PDU/MDUs 105A, 105B (e.g., including PDU/MDU outlets), power node 106, 108, and/or access point 110, 112 using (or based on) its updated heuristic at, for example, network devices 102A, 102B, 104A, 118, PDU/MDUs 105A, 105B, power nodes 106, 108, access points 110, 112, and/or network node 116.

At step 204, network devices 102A, 102B, 104A, 118, PDU/MDUs 105A, 105B, power nodes 106, 108, access points 110, 112, and/or network node 116 can detect a change in and/or a current power state of, for example, PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N) and/or access points 110, 112. For example, power nodes 106, 108 can receive (or fail to receive) signals at an interface 902, 904 and/or processing system 906 from UPS modules 106A-106N, battery modules 140A-140N, control module 142, conventional power supply modules 136A-136N, PDU/MDUs 105A, 105B, and/or access points 110, 112 and use the signals (or lack thereof) to detect loss of: input power source 138, conventional power supply modules 136A-136N, PDU/MDUs 105A, 105B (e.g., including PDU/MDU outlets), and/or access points 110, 112. On detection of loss, PDU/MDUs 105A, 105B, power nodes 106, 108, and/or access points 110, 112 can engage and/or control functions of UPS modules 106A-106N. For example, PDU/MDUs 105A, 105B, power nodes 106, 108, and/or access points 110, 112 can engage a discharging function of battery modules 140A-140N to provide regulated, uninterrupted power to network devices 102A, 102B, 104A, 118, PDU/MDUs 105A, 105B (e.g., including PDU/MDU outlets), power nodes 106, 108, and/or access points 110, 112 operating in a configured critical usage window.

At step 206, network devices 102A, 102B, 104A, 118, PDU/MDUs 105A, 105B, power nodes 106, 108, access points 110, 112, and/or network node 116 can dynamically adjust, change, and/or control a current power state of PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112 during a critical window. For example, if, at step 204, power nodes 106, 108 detect a loss of input power source 138, conventional power supply modules 136A-136N, PDU/MDUs 105A, 105B (e.g., including PDU/MDU outlets), and/or access point 110, 112, the power nodes 106, 108 can send a notification to alert an end-user of the detected loss (e.g., via an interface 902, 904 and/or application such as, for example, a SmartConnect Personal Application, hosted at network device 118). The notification can include the critical usage window information for "on," "off," "idle," and/or "active" network devices 102A, 102B, 104A, 118 coupled to (or in communication with) PDU/MDUs 105A, 105B (e.g., including PDU/MDU outlets), power nodes 106, 108, and/or access points 110, 112. The notification can further include the critical usage window information for "on," "off," "idle," and/or "active" PDU/MDUs 105A, 105B (e.g., including PDU/MDU outlets) coupled to (or in communication with) network devices 102A, 102B, 104A, 118, power nodes 106, 108, and/or access points 110, 112. The end-user can change a current power state of PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112 based on the critical usage window information reported for network devices 102A, 102B, 104A, 118 and/or PDU/MDUs 105A, 105B. For example, if PDU/MDUs 105A, 105B and/or access points 110, 112 are supporting (or include) "on" or "active" network devices 102A, 102B operating during a configured critical usage window, the end-user (e.g., via an interface 902, 904 and/or SmartConnect application) can instruct power nodes 106, 108 to continue to engage the discharging function of battery modules 140A-140N to provide regulated, uninterrupted power to PDU/MDUs 105A, 105B (e.g., including PDU/MDU outlets) and/or access points 110, 112 and the supported network devices 102A, 102B, 104A for a duration of the configured critical usage window(s). Alternatively, if PDU/MDUs 105A, 105B and/or access points 110, 112 are supporting "off" or "idle" network devices 102A, 102B, 104A and/or "on" or "active" network devices 102A, 102B, 104A operating during a non-critical usage window, the end-user (e.g., via an interface 902, 904 and/or SmartConnect application) can instruct power nodes 106, 108 to suspend power to PDU/MDUs 105A, 105B (e.g., including PDU/MDU outlets) and/or access points 110, 112 and supported network devices 102A, 102B, 104A using a switching-off (or shutting down) function of and/or idle (or standby) mode of battery modules 140A-140N and/or can instruct power nodes 106, 108 to "drop" PDU/MDUs 105A, 105B (e.g., including PDU/MDU outlets) and/or access points 110, 112 and the supported network devices 102A, 102B, 104A until one or more of PDU/MDUs 105A, 105B (e.g., including PDU/MDU outlets), network devices 102A, 102B, 104A, and/or access points 110, 112 enter a configured critical usage window.

Figure 3:
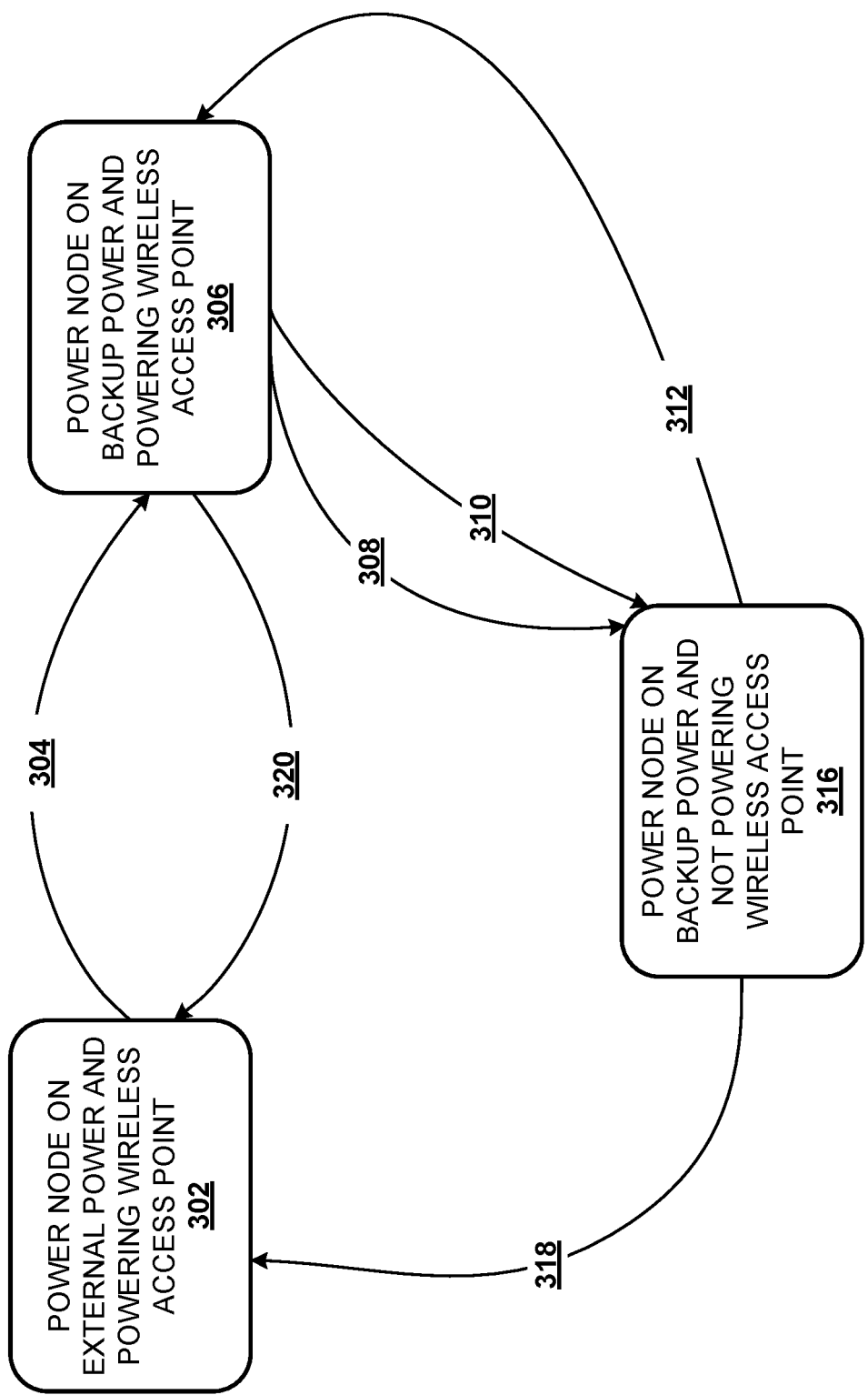
FIG. 3 is a schematic diagram that shows the exemplary network system of FIGS. 1A and 1B enabling a first mode of operation for power state management in accordance with an exemplary embodiment of the present disclosure.

With reference now to FIG. 3, a schematic diagram of a network system enabling a first mode of operation for power state management is depicted. The schematic diagram can be implemented in the exemplary network system 100 shown in FIGS. 1A and 1B, or with any suitable network system. The schematic diagram shown in FIG. 3 is discussed with reference to the network system 100 shown in FIGS. 1A and 1B. One skilled in the art, together with the description, will appreciate that various steps of the schematic diagram be omitted, rearranged, combined, and/or adapted in various ways.

At 302, a manual mode (i.e., a first mode) of operation is enabled at network devices 102A, 102B, 104A, 118, PDU/MDUs 105A, 105B, power nodes 106, 108, access points 110, 112, and/or network node 116. Power nodes 106, 108 can include conventional power supply modules 136A-136N and UPS modules 106A-106N. Conventional power supply modules 136A-136N can be coupled to an input power source 138 and provide charging energy to battery modules 140A-140N of UPS modules 106A-106N, PDU/MDUs 105A, 105B, and/or access points 110, 112 during normal conditions (e.g., conditions other than a blackout or brownout condition).

At 304, UPS modules 106A-106N and/or access points 110, 112 can detect a change in and/or a current power state of power nodes 106, 108 (e.g., including UPS modules 106A-106N, battery modules 140A-140N, control module 142, and/or conventional power supply modules 136A-136N), PDU/MDUs 105A, 105B (e.g., including PDU/MDU outlets), and/or access points 110, 112. For example, in one embodiment, UPS modules 106A-106N receive (or fail to receive) signals from conventional power supply modules 136A-136N, PDU/MDUs 105A, 105B (e.g., including PDU/MDU outlets), and/or access points 110, 112. The UPS modules 106A-106N may use the signals (or lack thereof) to detect loss of: an input power source 138, conventional power supply modules 136A-136N, PDU/MDUs 105A, 105B (e.g., including PDU/MDU outlets), and/or of access points 110, 112. On detection of loss, PDU/MDUs 105A, 105B, power nodes 106, 108, and/or access points 110, 112 can engage and/or control functions of UPS modules 106A-106N. For example, power nodes 106, 108 can engage a discharging function of battery modules 140A-140N to provide regulated, uninterrupted power to network devices 102A, 102B, 014A, PDU/MDUs 105A, 105B (e.g., including PDU/MDU outlets), power nodes 106, 108, and/or access points 110, 112.

At 306-310, an end-user can be situated at a visitor location (e.g., a first location outside a range of PDU/MDUs 105A, 105B, power nodes 106, 108, and/or access points 110, 112). PDU/MDUs 105A, 105B, power nodes 106, 108 (e.g., including UPS modules 106A-106N, battery modules 140A-140N, control module 142, and/or conventional power supply modules 136A-136N), and/or access points 110, 112 can send a notification to alert the end-user of the detected loss of power (step 304) (e.g., via an interface 902, 904 and/or application such as, for example, a SmartConnect Personal Application, hosted at network device 118). The notification can further inform the end-user of isolated and/or tagged network data and/or loads. For example, before, during, or after the detected loss of power, access points 110, 112 (or network nodes 102A, 102B, 104A, 118, PDU/MDUs 105A, 105B, power nodes 106, 108, and/or network node 116) can query network data of network loads at set time intervals. Access points 110, 112 (or network nodes 102A, 102B, 104A, 118, PDU/MDUs 105A, 105B, power nodes 106, 108, and/or network node 116) can isolate the network data, associate the isolated network data with network loads, and assign numerical gradients or tags to the isolated network data and/or network loads based on the query. For the isolated and/or tagged loads, the notification can include critical usage window information. The notification can further request that the end-user suspend power (e.g., via an interface 902, 904 and/or SmartConnect application) to PDU/MDUs 105A, 105B (e.g., including PDU/MDU outlets) and/or access points 110, 112 and supported network devices 102A, 102B, 104A using the switching-off (or shutting down) function of and/or idle (or standby) mode of battery modules 140A-140N and/or can request that the end-user instruct power nodes 106, 108 to "drop" PDU/MDUs 105A, 105B (e.g., including PDU/MDU outlets) and/or access points 110, 112. Further, the notification can request that the end-user instruct PDU/MDUs 105A, 105B (e.g., including PDU/MDU outlets) and/or access points 110, 112 to "drop" supported network devices 102A, 102B, 104A operating outside its critical usage window and/or based on assigned tags. In some instances, network devices 102A, 102B, 104A may be supported directly at the power nodes 106, 108 and/or otherwise apart from PDU/MDUs 105A, 105B and/or access points 110, 112 using, for example, alternative power nodes, UPS modules, and/or internal battery modules configured at the network devices 102A, 102B, 104.

At 308, the end-user can dismiss (e.g., via an interface 902, 904 and/or SmartConnect application) the notification request. For example, if the notification indicates that the isolated and/or tagged network loads are "high-priority" and/or "critical" loads and/or that the network loads are operating during a configured critical usage window, the end-user can dismiss (e.g., via an interface 902, 904 and/or SmartConnect application) the notification request and continue to provide regulated, uninterrupted power to network devices 102A, 102B, 104A, PDU/MDUs 105A, 105B (e.g., including PDU/MDU outlets), power nodes 106, 108, and/or access points 110, 112 for the duration of the configured critical usage window. As the runtime capacity of the battery modules 140A-140N deplete, PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112 can send update notifications (e.g., via an interface 902, 904 and/or application) that alert the end-user of a current status (e.g., a percentage of charge remaining) of battery modules 140A-140N. Alternatively, the end-user can configure, adjust, and/or specify default alert thresholds (e.g., at 95% of charge remaining, at 50% of charge remaining, at 25% of charge remaining, at 5% of charge remaining, etc.) for a current status of the battery modules 140A-140N. Steps 306 and 308 can repeat.

At 310, the end-user can accept (e.g., via an interface 902, 904 and/or SmartConnect application) the notification request. For example, if the notification indicates that the isolated and/or tagged network loads are "low-priority," "medium priority," "redundant," and/or "non-critical" loads and/or that the network loads are "on," "off," "idle," or "active" network devices 102A, 102B, 104A, PDU/MDUs 105A, 105B (e.g., including PDU/MDU outlets), power nodes 106, 108, and/or access points 110, 112 operating during a non-critical usage window, the end-user can accept (e.g., via an interface 902, 904 and/or SmartConnect application) the notification request. Acceptance of the notification request suspends power to network devices 102A, 102B, 104A, PDU/MDUs 105A, 105B (e.g., including PDU/MDU outlets), power nodes 106, 108, and/or access points 110, 112 using a switching-off (or shutting down) function of and/or idle (or standby) mode of battery modules 140A-140N and/or "drops" supported network devices 102A, 102B, 104A and/or PDU/MDUs 105A, 105B (e.g., including PDU/MDU outlets) operating outside its critical usage window and/or assigned "low priority," "medium priority," "redundant," or "non-critical" tags. If network devices 102A, 102B, 104A, PDU/MDUs 105A, 105B, power nodes 106, 108, and/or access points 110, 112 operating in an idle (or standby) mode enter a critical usage window and/or the assigned tag is adjusted or changed to "high-priority" or "critical," an update notification can be sent (e.g., via an interface 902, 904 and/or SmartConnect application) to alert the end-user of the adjusted or changed status. Alternatively, acceptance of the notification request can include a set duration (e.g., milliseconds, seconds, minutes, hours, days, etc.) for suspension of power to network devices 102A, 102B, 104A, PDU/MDUs 105A, 105B (e.g., including PDU/MDU outlets), power nodes 106, 108, and/or access points 110, 112. After the set duration expires, a switching-on (or turning on) function of battery modules 140A-140N can be automatically enabled such that power is supplied to network devices 102A, 102B, 104A, PDU/MDUs 105A, 105B (e.g., including PDU/MDU outlets), power nodes 106, 108, and/or access points 110, 112. Steps 306 and 310 can repeat.

Steps 306-310 can be performed at a home location (e.g., a second location within a range of PDU/MDUs 105A, 105B, power nodes 106, 108, and/or access points 110, 112). If the end-user is situated at the home location, the notification request includes a warning that suspending power to network devices 102A, 102B, 104A, PDU/MDUs 105A, 105B (e.g., including PDU/MDU outlets), power nodes 106, 108, and/or access points 110, 112 will cause the end-user to lose a connection to communication network 116.

At 312, at the home location, the end-user can manually cause PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112 to adjust, change, and/or control functions of UPS modules 106A-106N such as, for example, charging battery modules 140A-140N, discharging battery modules 140A-140N, switching-off (or shutting-down) battery modules 140A-140N, and/or causing battery modules 140A-140N to enter an idle (or standby) mode at, for example, interfaces 902, 904 of a control module associated with the same. In some instances, at step 316, PDU/MDUs 105A, 105B, power nodes 106, 108, and/or access points 110, 112 can engage a discharging function of battery modules 140A-140N such that power nodes 106, 108 self-charge (or power) even when the power nodes 106, 108 are not supporting network loads.

At 318 and 320, power nodes 106, 108 (e.g., including UPS modules 106A-106N, battery modules 140A-140N, control module 142, and/or conventional power supply modules 136A-136N) are coupled to input power source 138. When PDU/MDUs 105A, 105B, power nodes 106, 108, and/or access points 110, 112 detect a change and/or current power state of input power source 138 and/or conventional power supply modules 136A-136N from "off" or "idle" to "on" or "active," the PDU/MDUs 105A, 105B, power nodes 106, 108, and/or access points 110, 112 can switch from using battery power (e.g., using battery modules 140A-140N) to using input power source 138 and/or conventional power supply modules 136A-136N. Conventional power supply modules 136A-136N can provide charging energy to battery modules 140A-140N of UPS modules 106A-106N.

Figure 4:
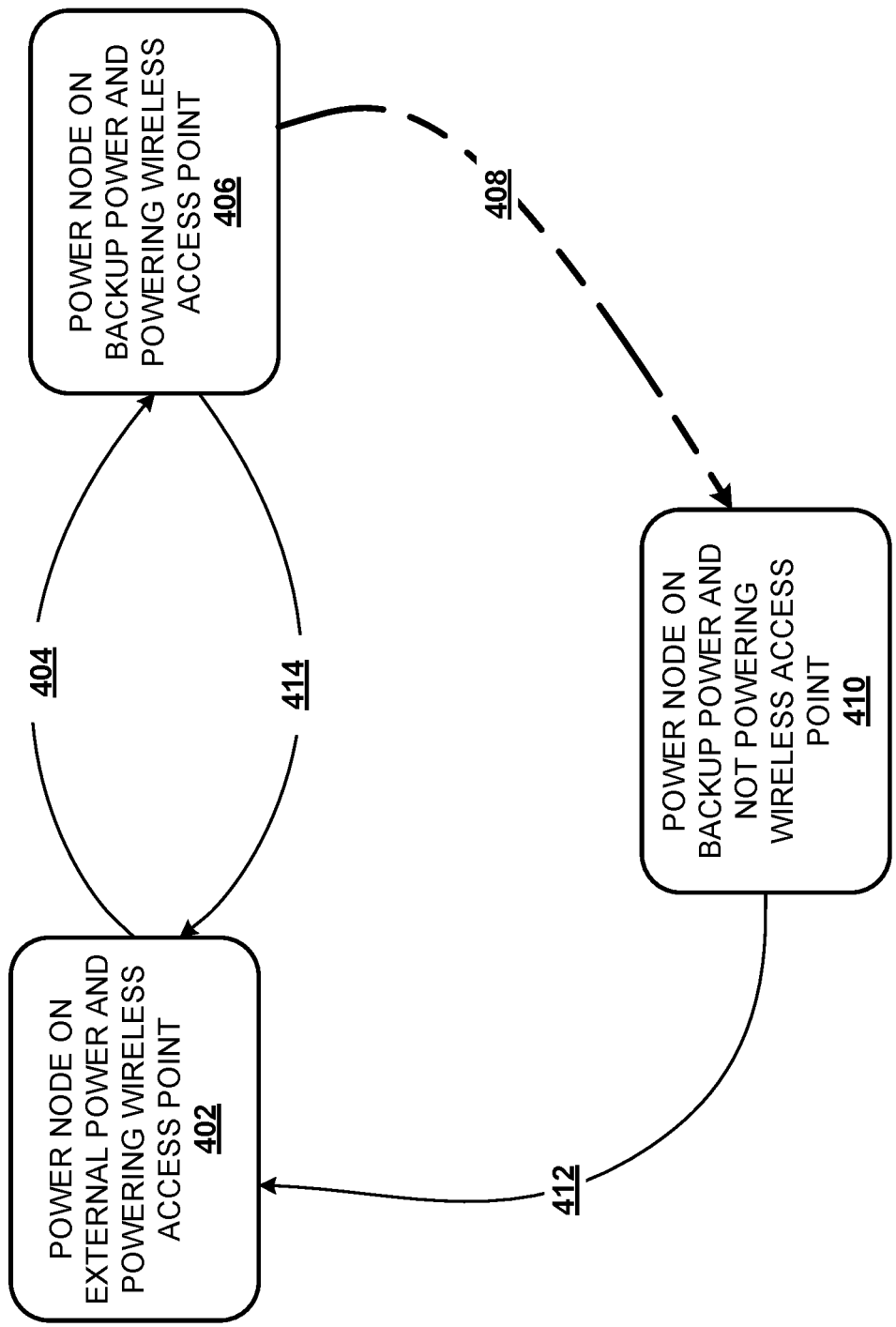
FIG. 4 is a schematic diagram that shows the exemplary network system of FIGS. 1A and 1B enabling a second mode of operation for power state management in accordance with an exemplary embodiment of the present disclosure.

With reference now to FIG. 4, a schematic diagram of a network system enabling a second mode of operation for power state management is depicted. The schematic diagram can be implemented in the exemplary network system 100 shown in FIGS. 1A and 1B, or with any suitable network system. The schematic diagram shown in FIG. 4 is discussed with reference to the network system 100 shown in FIGS. 1A and 1B One skilled in the art, together with the description, will appreciate that various steps of the schematic diagram be omitted, rearranged, combined, and/or adapted in various ways.

At 402, an automatic (i.e., a second mode) mode of operation is enabled at network devices 102A, 102B, 104A, 118, PDU/MDUs 105A, 105B, power nodes 106, 108, access points 110, 112, and/or network node 116. Power nodes 106, 108 can include conventional power supply modules 136A-136N and UPS modules 106A-106N. Conventional power supply modules 136A-136N can be coupled to an input power source 138 and provide charging energy to PDU/MDUs 105A, 105B (e.g., including PDU/MDU outlets), battery modules 140A-140N of UPS modules 106A-106N, and/or access points 110, 112 during normal conditions.

At 404, PDU/MDUs 105A, 105B, UPS modules 106A-106N, and/or access points 110, 112 can detect a change in and/or a current power state of PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112. For example, in one embodiment, UPS modules 106A-106N receive (or fail to receive) signals from PDU/MDUs 105A, 105B, conventional power supply modules 136A-136N, and/or access points 110, 112. The UPS modules 106A-106N may use the signals (or lack thereof) to detect loss of: an input power source 138, conventional power supply modules 136A-136N, PDU/MDUs 105A, 105B (e.g., including PDU/MDU outlets), and/or access points 110, 112. On detection of loss, PDU/MDUs 105A, 105B, power nodes 106, 108, and/or access points 110, 112 can engage and/or control functions of UPS modules 106A-106N. For example, PDU/MDUs 105A, 105B, power nodes 106, 108, and/or access points 110, 112 can engage a discharging function of battery modules 140A-140N to provide regulated, uninterrupted power to network devices 102A, 102B, 104A, 118, PDU/MDUs 105A, 105B (e.g., including PDU/MDU outlets), power nodes 106, 108, and/or access points 110, 112.

At 406, the discharging function of battery modules 140A-140N is engaged and an end-user is situated at a visitor location. In automatic mode, network devices 102A, 102B, 104A, 118, PDU/MDUs 105A, 105B, power nodes 106, 108, access points 110, 112, and/or network node 116 can dynamically adjust, change, and/or control a power state of PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112 during a critical window.

In one exemplary embodiment, a machine-learning mechanism can be executed at processing node 900 and/or other cloud based or external control modules. The machine-learning mechanism can be used to correlate network usage at variable time instants for each of network devices 102A, 102B, 104A, PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112. Using the correlations, the machine-learning mechanism can generate unique network usage models for each of network devices 102A, 102B, 104A, PDU/MDUs 105A, 105B (e.g., including PDU/MDU outlets), power nodes 106, 108, and/or access points 110, 112 at set time intervals. In addition, the machine-learning mechanism can generate a basic heuristic (e.g. based on an aggregation of all of the unique network usage models) and, using the generated basic heuristic, can further generate a base network usage model (or pattern) for network devices 102A, 102B, 104A, PDU/MDUs 105A, 105B (e.g., including PDU/MDU outlets), power nodes 106, 108, and/or access points 110, 112 such as, for example, a base network usage model that is "offline" from 1:00 a.m. until 5:00 a.m. The generated base network usage model can be updated for each of network devices 102A, 102B, 104A, PDU/MDUs 105A, 105B (e.g., including PDU/MDU outlets), power nodes 106, 108, and/or access points 110, 112 using its own unique network usage model. For example, based on its unique network usage model, network device 102A's base network usage model may be updated to indicate that network device 102A is "online" from 1:00 a.m. until 2:00 a.m. rather than "offline". Critical usage windows can be dynamically configured for each network device 102A, 102B, 104A, 118, PDU/MDUs 105A, 105B (e.g., including PDU/MDU outlets), power node 106, 108, and/or access point 110, 112 using (or based on) its updated heuristic.

At 408, PDU/MDUs 105A, 105B, power nodes 106, 108 (e.g., including UPS modules 106A-106N, battery modules 140A-140N, control module 142, and/or conventional power supply modules 136A-136N), and/or access points 110, 112 can send a notification to alert an end-user of the detected loss of power (steps 404 and 406) (e.g., via an interface 902, 904 and/or application such as, for example, a SmartConnect Personal Application, hosted at network device 118). Before, during, and/or after sending the notification, PDU/MDUs 105A, 105B, power nodes 106, 108, and/or access points 110, 112 can evaluate (e.g., by performing deep packet inspection of network protocols, network data traffic, UPS module outlet setup, PDU/MDU outlet setup, etc., associated with, for example, network devices 102A, 102B, 104A, 118, PDU/MDUs 105A, 105B, power nodes 106, 108, and/or access points 110, 112) critical usage window information for network devices 102A, 102B, 104A, PDU/MDUs 105A, 105B (e.g., including PDU/MDU outlets), power nodes 106, 108, and/or access points 110, 112. If, after the evaluation, PDU/MDUs 105A, 105B, power nodes 106, 108, and/or access points 110, 112 determine, for example, that PDU/MDUs 105A, 105B and/or access points 110, 112 are supporting (or include) "on" or "active" network devices 102A, 102B, 104A operating during a configured critical usage window, PDU/MDUs 105A, 105B, power nodes 106, 108, and/or access points 110, 112 (e.g., via an interface 902, 904 and/or SmartConnect application) can alert (e.g., by sending a notification) the end-user that PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112 will continue to engage the discharging function of battery modules 140A-140N to provide regulated, uninterrupted power to PDU/MDUs 105A, 105B (e.g., including PDU/MDU outlets) and/or access points 110, 112 and supported network devices 102A, 102B, 104A for the duration of the configured critical usage windows.

Alternatively, if, after the evaluation, PDU/MDUs 105A, 105B, power nodes 106, 108, and/or access points 110, 112 determine, for example, that PDU/MDUs 105A, 105B (e.g., including PDU/MDU outlets) and/or access points 110, 112 are supporting (or include) "off" or "idle" network devices 102A, 102B, 104A and/or "on" or "active" network devices 102A, 102B, 104A operating during a non-critical usage window, PDU/MDUs 105A, 105B, power nodes 106, 108, and/or access points 110, 112 (e.g., via an interface 902, 904 and/or SmartConnect application) can alert (e.g., by sending a notification) the end-user that PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112 will suspend power to PDU/MDUs 105A, 105B (e.g., including PDU/MDU outlets) and/or access points 110, 112 and supported network devices 102A, 102B, 104A using a switching-off (or shutting down) function of and/or idle (or standby) mode of battery modules 140A-140N and/or will "drop" PDU/MDUs 105A, 105B (e.g., including PDU/MDU outlets) and/or access points 110, 112 and supported network devices 102A, 102B, 104A operating outside a configured critical usage window until PDU/MDUs 105A, 105B (e.g., including PDU/MDU outlets) and/or access points 110, 112 and supported network devices 102A, 102B, 104A enter a configured critical usage window. The notification request can include a set duration (e.g., milliseconds, seconds, minutes, hours, days, etc.) for suspension of power to network devices 102A, 102B, 104A, PDU/MDUs 105A, 105B (e.g., including PDU/MDU outlets), power nodes 106, 108, and/or access points 110, 112. After the set duration expires, a switching-on (or turning on) function of battery modules 140A-140N can be automatically enabled such that power is supplied to network devices 102A, 102B, 104A, PDU/MDUs 105A, 105B (e.g., including PDU/MDU outlets), power nodes 106, 108, and/or access points 110, 112. Alternatively, the end-user can override (e.g., via an interface 902, 904 and/or SmartConnect application) the automatic mode of operation and continue to provide regulated, uninterrupted power to network devices 102A, 102B, 104A, PDU/MDUs 105A, 105B (e.g., including PDU/MDU outlets), power nodes 106, 108, and/or access points 110, 112 regardless of the critical usage window information.

In one exemplary embodiment, PDU/MDUs 105A, 105B, power nodes 106, 108, and/or access points 110, 112 can operate in conjunction with a human-aided machine learning mechanism executed at process node 900 and/or other cloud-based or external control modules to predict network usage at variable time instants for each of network devices 102A, 102B, 104A, PDU/MDUs 105A, 105B (e.g., including PDU/MDU outlets), power nodes 106, 108, and/or access points 110, 112. For example, processing node 900 and/or other cloud-based or external control modules can collect network traffic data from network devices 102A, 102B, 104A, PDU/MDUs 105A, 105B (e.g., including PDU/MDU outlets), power nodes 106, 108, and/or access points 110, 112 at set time intervals (e.g., milliseconds, seconds, minutes, hours, days, etc.); the collected network traffic data can be sent to a rules engine hosted at (or that forms part of) the human-aided machine learning mechanism. The rules engine correlates the updated heuristics for each network device 102A, 102B, 104A, PDU/MDUs 105A, 105B (e.g., including PDU/MDU outlets), power node 106, 108, and/or access point 110, 112 with the collected information. Using the correlation, the rules engine predicts a current usage window and/or current power state for network devices 102A, 102B, 104A, PDU/MDUs 105A, 105B, power nodes 106, 108 (e.g., including UPS modules 106A-106N, battery modules 140A-140N, control module 142, and/or conventional power supply modules 136A-136N), and/or access points 110, 112. If the rules engine predicts, for example, that PDU/MDUs 105A, 105B, power nodes 106, 108, and/or access points 110, 112 are supporting (or include) "on" or "active" network devices 102A, 102B, 104A operating during a configured critical usage window, the PDU/MDUs 105A, 105B, power nodes 106, 108, and/or access points 110, 112 (e.g., via an interface 902, 904 and/or an application) can alert (e.g., by sending a notification) the end-user that the rules engine predicts that PDU/MDUs 105A, 105B, power nodes 106, 108, and/or access points 110, 112 are supporting "on" or "active" network devices 102A, 102B, 104A operating during a configured critical usage window and the PDU/MDUs 105A, 105B, power nodes 106, 108, and/or access points 110, 112 will continue to engage the discharging function of battery modules 140A-140N to provide regulated, uninterrupted power to PDU/MDUs 105A, 105B (e.g., including PDU/MDU outlets) and/or access points 110, 112 and supported network devices 102A, 102B, 104A for the duration of the configured critical usage windows. The rule engine can attempt to find patterns associated with the critical windows and/or current power states of network device 102A, 102B, 104A, PDU/MDUs 105A, 105B (e.g., including PDU/MDU outlets), power node 106, 108, and/or access point 110, 112. In addition, the human-aided machine learning mechanism can enable machine learning such that correct and/or incorrect predictions (e.g., whether or not the end-user accepts and/or dismisses notifications to engage and/or disengage the discharging function of battery modules 140A-140N) can be tracked. The human-aided machine learning mechanism can assign weightings to predictions and update the weightings (e.g., assign an importance coefficient) based on whether or not the end-user accepts and/or dismisses an associated notification. In this manner, machine-learning can be used to predict and/or send more accurate notifications to the end-user.

Steps 406 and 408 can be performed at a home location. If the end-user is situated at the home location, the notification includes a warning that suspending power to and/or "dropping" PDU/MDUs 105A, 105B (e.g., including PDU/MDU outlets), power nodes 106, 108, access points 110, 112, and/or supported network devices 102A, 102B, 104A will cause the end-user to lose a connection to network 116.

At 410, at the home location, the end-user can dismiss the notification and/or manually instruct (e.g., via an interface 902, 904 and/or SmartConnect application) power nodes 106, 108 continue to provide regulated, uninterrupted power to network devices 102A, 102B, 104A, PDU/MDUs 105A, 105B (e.g., including PDU/MDU outlets), power nodes 106, 108, and/or access points 110, 112 regardless of critical usage window information. Further, PDU/MDUs 105A, 105B, power nodes 106, 108, and/or access points 110, 112 can automatically adjust, change, and/or control functions of UPS modules 106A-106N such as, for example, charging battery modules 140A-140N, discharging battery modules 140A-140N, switching-off (or shutting-down) battery modules 140A-140N, and/or causing battery modules 140A-140N to enter an idle (or standby) mode. In some instances, PDU/MDUs 105A, 105B, power nodes 106, 108, and/or access points 110, 112 can automatically engage a discharging function of battery modules 140A-140N such that PDU/MDUs 105A, 105B, power nodes 106, 108, and/or access points 110, 112 self-charge (or power) even when the PDU/MDUs 105A, 105B, power nodes 106, 108, and/or access points 110, 112 are not supporting network loads.

At 412 and 414, power nodes 106, 108 (e.g., including UPS modules 106A-106N, battery modules 140A-140N, control module 142, and/or conventional power supply modules 136A-136N) are coupled to input power source 138. When PDU/MDUs 105A, 105B, power nodes 106, 108, and/or access points 110, 112 detect a change and/or current power state of input power source 138 and/or conventional power supply modules 136A-136N from "off" or "idle" to "on" or "active," the power nodes 106, 108 can automatically switch from using battery power (e.g., using battery modules 140A-140N) to using input power source 138 and/or conventional power supply modules 136A-136N.

Conventional power supply modules 136A-136N can provide charging energy to battery modules 140A-140N of UPS modules 106A-106N.

Figure 5:
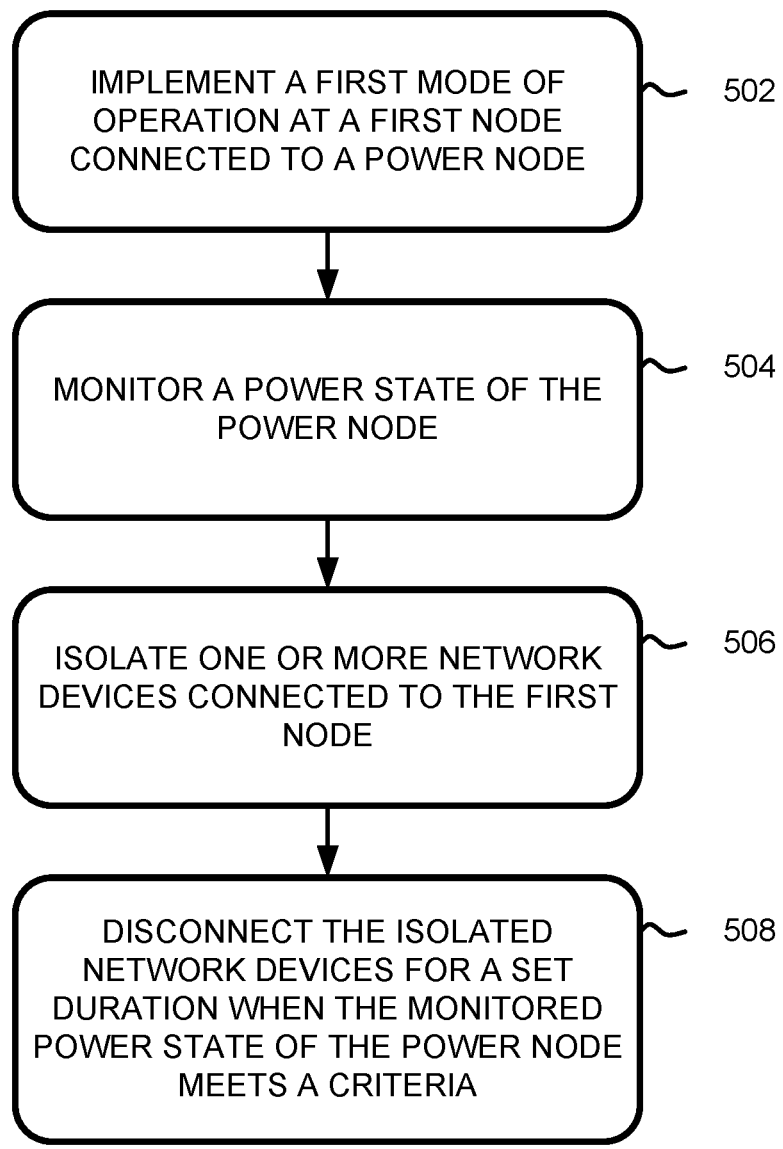
FIG. 5 is another flow diagram depicting a method for power state management at a network node in accordance with an exemplary embodiment of the present disclosure.

With reference now to FIG. 5, a flow diagram of an exemplary method for power state management at a network node is depicted. The method can be enabled in the exemplary network system 100 shown in FIGS. 1A and 1B, or with any suitable network system. The method for power state management shown in FIG. 5 is discussed with reference to the network system 100 shown in FIGS. 1A and 1B. In addition, while FIG. 5 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At steps 502 and 504, a first mode of operation may be enabled at a first node and a power state of a power node may be monitored. In one embodiment, a manual and/or automatic mode of operation can be enabled at network devices 102A, 102B, 104A, 118, PDU/MDUs 105A, 105B (e.g., including PDU/MDU outlets), power nodes 106, 108, access points 110, 112, and/or network node 116. PDU/MDUs 105A, 105B, UPS modules 106A-106N, and/or access points 110, 112 can monitor a current power state of PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112.

At step 506, one or more network devices connected to the first node can be isolated. Before, during, or after monitoring the power state of PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112, the access points 110, 112 (or other network nodes) can query network data of network loads at set time intervals. Access points 110, 112 (or other network nodes) can isolate network data of network loads that meet a set criteria.

At 508, PDU/MDUs 105A, 105B, UPS modules 106A-106N, and/or access points 110, 112 can detect a change in the current power state of PDU/MDUs 105A, 105B (e.g., including PDU/MDU outlets), power nodes 106, 108 (e.g., including UPS modules 106A-106N, battery modules 140A-140N, control module 142, and/or conventional power supply modules 136A-136N), and/or access points 110, 112. For example, UPS modules 106A-106N can receive (or fail to receive) signals from conventional power supply modules 136A-136N, PDU/MDUs 105A, 105B (e.g., including PDU/MDU outlets), and/or access points 110, 112. The UPS modules 106A-106N may use the signals (or lack thereof) to detect loss of: an input power source 138, conventional supply modules 136A-136N, PDU/MDUs 105A, 105B (e.g., including PDU/MDU outlets), and/or of access points 110, 112. On detection of loss, power nodes 106, 108 can engage a discharging function of battery modules 140A-140N to provide regulated, uninterrupted power to network devices 102A, 102B, 104A, PDU/MDUs 105A, 105B (e.g., including PDU/MDU outlets), power nodes 106, 108, and/or access points 110, 112. The end-user and/or the power nodes 106, 108 (e.g., via an interface 702, 704, application, or automatically) can suspend power to PDU/MDUs 105A, 105B (e.g., including PDU/MDU outlets) and/or access points 110, 112 and supported network devices 102A, 102B, 104A whose isolated network data meets the set criteria using the switching-off (or shutting down) function of and/or idle (or standby) mode of battery modules 140A-140N and/or can instruct PDU/MDUs 105A, 105B (e.g., including PDU/MDU outlets) and/or access points 110, 112 to "drop" supported network devices 102A, 102B, 104A whose isolated network data meets the set criteria.

Figure 6:
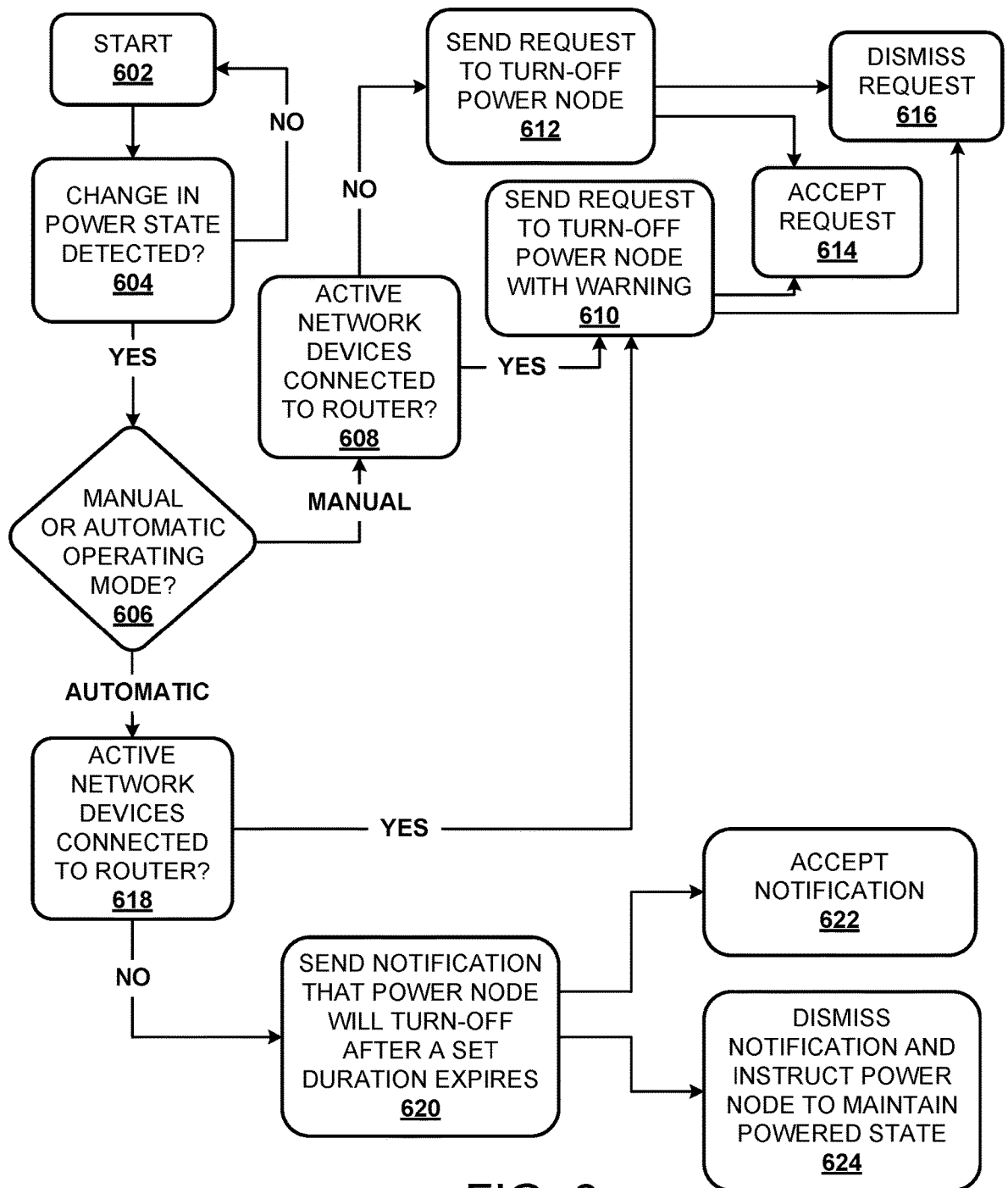
FIG. 6 is a flow chart diagram depicting methods for power state management at a network node in accordance with an exemplary embodiment of the present disclosure.

With reference now to FIG. 6, a flow chart diagram depicting methods for power state management is depicted. The schematic diagram can be enabled in the exemplary network system 100 shown in FIGS. 1A and 1B, or with any suitable network system. The flow chart diagram shown in FIG. 6 is discussed with reference to the network system 100 shown in FIGS. 1A and 1B One skilled in the art, together with the description, will appreciate that various steps of the schematic diagram be omitted, rearranged, combined, and/or adapted in various ways.

At step 602, PDU/MDUs 105A, 105B, power nodes 106, 108 (e.g., including UPS modules 106A-106N, battery modules 140A-140N, control module 142, and/or conventional power supply modules 136A-136N), and/or access points 110, 112 monitor a power state of PDU/MDUs 105A, 105B (e.g., including PDU/MDU outlets), power nodes 106, 108, and/or access points 110, 112. Step 602 repeats until, at step 604, PDU/MDUs 105A, 105B, UPS modules 106A-106N, and/or access points 110, 112 detect a change in the power state of PDU/MDUs 105A, 105B (e.g., including PDU/MDU outlets), power nodes 106, 108, and/or access points 110, 112. For example, UPS modules 106A-106N receive (or fail to receive) signals from conventional power supply modules 136A-136N, PDU/MDUs 105A, 105B (e.g., including PDU/MDU outlets), and/or access points 110, 112. The UPS modules 106A-106N may use the signals (or lack thereof) to detect loss of: an input power source 138, conventional power supply modules 136A-136N, PDU/MDUs 105A, 105B (e.g., including PDU/MDU outlets), and/or of access points 110, 112. On detection of loss, power nodes 106, 108 can engage a discharging function of battery modules 140A-140N to provide regulated, uninterrupted power to network devices 102A, 102B, 014A, PDU/MDUs 105A, 105B (e.g., including PDU/MDU outlets), power nodes 106, 108, and/or access points 110, 112.

At step 606, an operating mode of PDU/MDUs 105A, 105B, power nodes 106, 108, and/or access points 110, 112 is determined. For example, a manual and/or automatic operating mode of PDU/MDUs 105A, 105B, power nodes 106, 108, and/or access points 110, 112 can be configured at a processing node 900 and/or other cloud-based or external control module. In addition, an end-user can configure and/or adjust, at an interface 902, 904, the operating mode of PDU/MDUs 105A, 105B, power nodes 106, 108, and/or access points 110, 112. Processing node 900, other cloud-based or external control modules, PDU/MDUs 105A, 105B, power nodes 106, 108, and/or access points 110, 112 can report the updated operating mode to the end-user.

If, at step 606, the operating mode is a manual operating mode, then, at step 608, PDU/MDUs 105A, 105B, power nodes 106, 108, and/or access points 110, 112 collect network usage information from, for example, PDU/MDUs 105A, 105B (e.g., including PDU/MDU outlets) and/or access points 110, 112 and supported network devices 102A, 102B, 104A. The network usage information can indicate that PDU/MDUs 105A, 105B (e.g., including PDU/MDU outlets) and/or access points 110, 112 and supported network devices 102A, 102B, 104A are "on," "off," "idle," or "active." If, at step 608, PDU/MDUs 105A, 105B (e.g., including PDU/MDU outlets) and/or access points 110, 112 and supported network devices 102A, 102B, 104A are "on" or "active," then, at step 610, PDU/MDUs 105A, 105B, power nodes 106, 108, and/or access points 110, 112 send a notification (e.g., via an interface 902, 904 and/or application such as, for example, a SmartConnect Personal Application, hosted at network device 118) requesting that an end-user suspend power to PDU/MDUs 105A, 105B (e.g., including PDU/MDU outlets) and/or access points 110, 112 and supported network devices 102A, 102B, 104A using the switching-off (or shutting down) function of and/or idle (or standby) mode of battery modules 140A-140N and/or requests that the end-user instruct PDU/MDUs 105A, 105B (e.g., including PDU/MDU outlets) and/or access points 110, 112 to "drop" supported network devices 102A, 102B, 104A. When the PDU/MDUs 105A, 105B (e.g., including PDU/MDU outlets) and/or access points 110, 112 and/or supported network devices 102A, 102B, 104A are "on" or "active," then the notification includes a warning that suspending power to PDU/MDUs 105A, 105B (e.g., including PDU/MDU outlets) and/or access points 110, 112 and/or supported network devices 102A, 102B, 104A will cause the PDU/MDUs 105A, 105B (e.g., including PDU/MDU outlets) and/or access points 110, 112 to lose a connection to communication network 116. If, however, at step 608, PDU/MDUs 105A, 105B (e.g., including PDU/MDU outlets) and/or access points 110, 112 and supported network devices 102A, 102B, 104A are "off" or "idle," then, at step 612, PDU/MDUs 105A, 105B, power nodes 106, 108, and/or access points 110, 112 send a notification (e.g., via an interface 902, 904 and/or application) requesting that an end-user suspend power to PDU/MDUs 105A, 105B (e.g., including PDU/MDU outlets) and/or access points 110, 112 and supported network devices 102A, 102B, 104A using the switching-off (or shutting down) function of and/or idle (or standby) mode of battery modules 140A-140N. Because PDU/MDUs 105A, 105B (e.g., including PDU/MDU outlets) and/or access points 110, 112 and/or supported network devices 102A, 102B, 104A are "off" or "idle," the notification does not include a warning. At step 614, the end-user can accept the request or, at step 616, the end-user can dismiss the request.

If, at step 606, the operating mode is an automatic operating mode, then, at step 618, PDU/MDUs 105A, 105B, power nodes 106, 108, and/or access points 110, 112 collect network usage information from, for example, PDU/MDUs 105A, 105B (e.g., including PDU/MDU outlets), access points 110, 112, and/or supported network devices 102A, 102B, 104A. The network usage information can indicate that PDU/MDUs 105A, 105B (e.g., including PDU/MDU outlets) and/or access points 110, 112 and supported network devices 102A, 102B, 104A are "on," "off," "idle," or "active." If, at step 618, PDU/MDUs 105A, 105B (e.g., including PDU/MDU outlets) and/or access points 110, 112 and/or supported network devices 102A, 102B, 104A are "on" or "active," then, at step 610, PDU/MDUs 105A, 105B, power nodes 106, 108, and/or access points 110, 112 send a notification (e.g., via an interface 902, 904 and/or SmartConnect application) requesting that an end-user suspend power to PDU/MDUs 105A, 105B (e.g., including PDU/MDU outlets) and/or access points 110, 112 and supported network devices 102A, 102B, 104A using the switching-off (or shutting down) function of and/or idle (or standby) mode of battery modules 140A-140N and/or requests that the end-user instruct PDU/MDUs 105A, 105B (e.g., including PDU/MDU outlets) and/or access points 110, 112 to "drop" supported network devices 102A, 102B, 104A. When the PDU/MDUs 105A, 105B (e.g., including PDU/MDU outlets) and/or access points 110, 112 and/or supported network devices 102A, 102B, 104A are "on" or "active," then the notification includes a warning that suspending power to PDU/MDUs 105A, 105B (e.g., including PDU/MDU outlets) and/or access points 110, 112 and/or supported network devices 102A, 102B, 104A will cause the PDU/MDUs 105A, 105B (e.g., including PDU/MDU outlets) and/or access points 110, 112 to lose a connection to network 116. At step 614, the end-user can accept the request or, at step 616, the end-user can dismiss the request.

If, however, at step 618, PDU/MDUs 105A, 105B (e.g., including PDU/MDU outlets) and/or access points 110, 112 and supported network devices 102A, 102B, 104A are "off" or "idle," then, at step 620, PDU/MDUs 105A, 105B, power nodes 106, 108, and/or access points 110, 112 send a notification (e.g., via an interface 902, 904 and/or SmartConnect application) alerting the end-user that PDU/MDUs 105A, 105B, power nodes 106, 108 and/or access points 110, 112 will automatically suspend power to PDU/MDUs 105A, 105B (e.g., including PDU/MDU outlets) and/or access points 110, 112 and supported network devices 102A, 102B, 104A using a switching-off (or shutting down) function of and/or idle (or standby) mode of battery modules 140A-140N after a set duration expires. At step 622, the end-user can accept the notification. At step 624, the end-user can dismiss the notification and instruct PDU/MDUs 105A, 105B (e.g., including PDU/MDU outlets), power nodes 106, 108, and/or access points 110, 112 to maintain a powered state.

Figure 7:
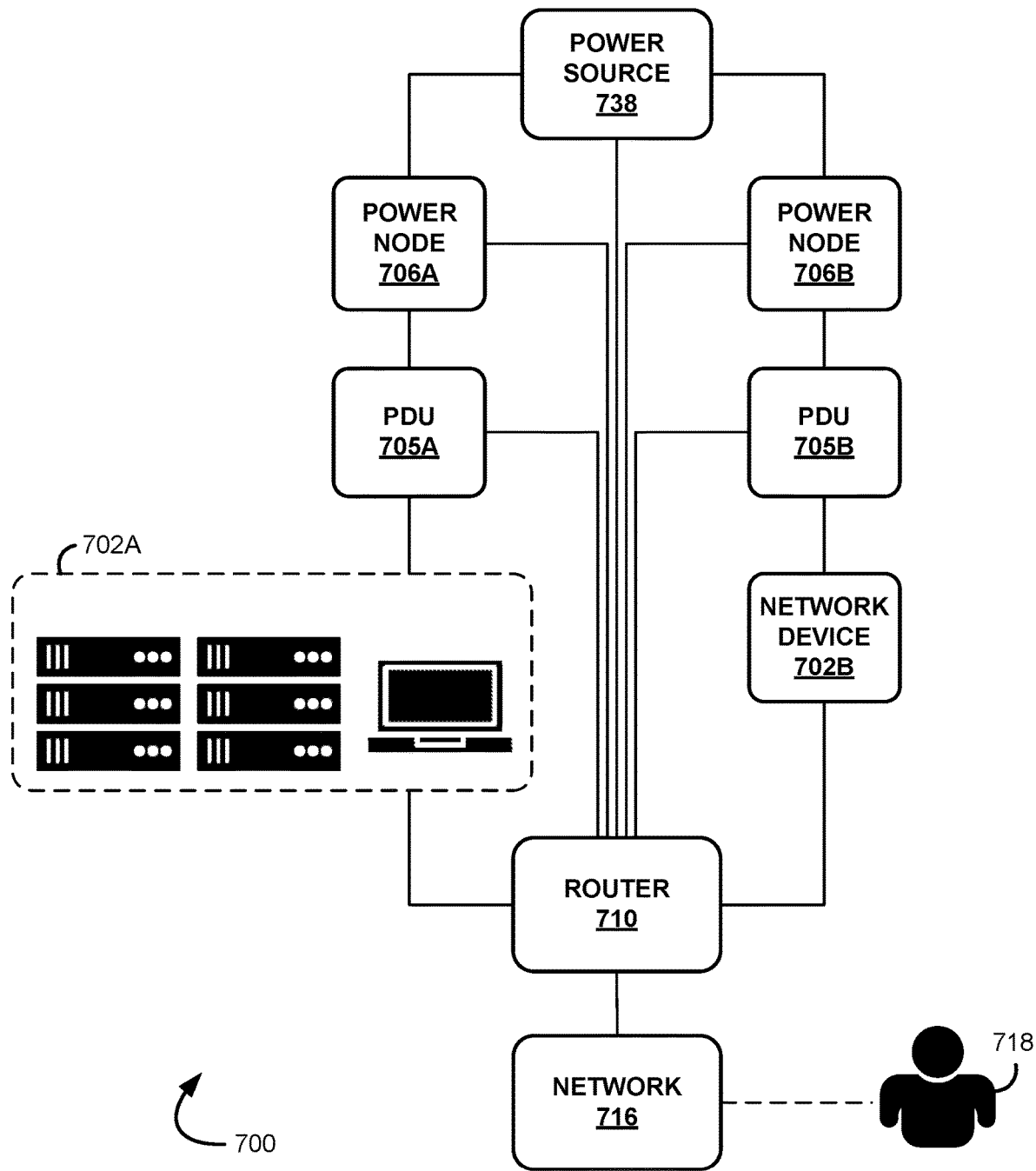
FIG. 7 is a schematic view of an exemplary network system configured to enable power state management at a network node in accordance with an exemplary embodiment of the present disclosure.

With reference now to FIG. 7, a schematic view of a network system 700 is depicted. System 700 includes network devices 702A, 702B, 718 (e.g., a datacenter, server farm, remote terminal unit, computing platform, and/or other internet access device, etc.), which can use a LAN, WAN or internetwork (including the Internet) to communicate over communication network (shown in FIG. 1). The network devices 702A, 702B, 718 can be coupled to or otherwise connected to, for example, metered and/or unmetered PDUs and/or MDUs 705A, 705B. System 700 further includes power nodes 706A, 706B, access point 710, network node 716, and input power source 738 (e.g., utility mains, etc.). It is noted that the system components in FIG. 7 are not shown in any particular positioning.

System 700 enables smart, power state management at network devices 702A, 702B, 718, PDU/MDUs 705A, 705B, and/or power nodes 706A, 706B by monitoring, at a processing node and/or other cloud-based or external control module (e.g., at a central Remote Monitoring and Management (RMM) tool) configured to communicate with system 700, a power state (e.g., utility mains available, utility mains unavailable, utility mains unreliable, on, off, idle, active, artificial sleep, low-energy mode, hibernating, etc.) of the input power source 738, power nodes 706A, 706B, PDU/MDUs 705A, 705B, network devices 702A, 702B, 718, and/or access point 710 and, when appropriate (e.g., after a grace period, predetermined wait time period, etc.), suspending power to, for example, network loads (e.g., network devices 702A, 702B, 718, PDU/MDUs 705A, 705B, power nodes 706A, 706B, and/or access point 710) for a set duration (e.g., milliseconds, seconds, minutes, hours, days, etc.). In other words, power state management decisions at network devices 702A, 702B, 718, PDU/MDUs 705A, 705B, and/or power nodes 706A, 706B can be determined using startup and/or shutdown rules configured based on the power state of the input power source 738, power nodes 706A, 706B, PDU/MDUs 705A, 705B, network devices 702A, 702B, 718, and/or access point 710 and power availability.

In one embodiment, access point 710 can be configured as a wired and/or wireless router and/or other gateway node. Access point 710 can facilitate receipt, routing, and/or forwarding of network data. Access point 710 can query and/or monitor network data (e.g., using an RMM tool) at set time intervals (e.g., milliseconds, seconds, minutes, hours, days, etc.). Access point 710, working in conjunction with power nodes 706A, 706B and/or PDU/MDUs 705A, 705B, can isolate the network data (e.g., by performing deep packet inspection of network protocols, network data traffic, PDU/MDU outlet setup, UPS module outlet setup, memory, hard-drive space, number of open files, open network connections, applications running, number of guest VMs running, etc., associated with, for example, network devices 702A, 702B, PDU/MDUs 705A, 705B, power nodes 706A, 706B, and/or access point 710) and associate the isolated network data with, for example, network loads, and assign priority tags (e.g., redundant, critical, non-critical, etc.) to the isolated network data and/or associated network loads based on the query.

On detection of a change in and/or a current power state of input power source 738, power nodes 706A, 706B, PDU/MDUs 705A, 705B, and/or access point 710 and, depending on a current operating mode (e.g., manual or automatic), network devices 702A, 702B, 718, PDU/MDUs 705A, 705B, power nodes 706A, 706B, and/or access point 710 can shed (or trigger suspension of power to) the isolated and/or tagged network data and/or network loads after a grace period for a set duration (e.g., milliseconds, seconds, minutes, hours, days, etc.).

For example, in one embodiment, network devices 702A, 702B, 718, PDU/MDUs 705A, 705B, power nodes 706A, 706B, and/or access point 710 can be integrated with (e.g., at a control module and/or the RMM tool) a communication interface 902, user interface 904, and/or processing system 906 (as shown in FIG. 9). The interfaces 902, 904 and/or processing system 906 can receive input signals that, for example, instruct adjustment, change, and/or control of a current power state of network devices 702A, 702B, 718, PDU/MDUs 705A, 705B, power nodes 706A, 706B, and/or access point 710. The interfaces 902, 904 and/or processing system 906 can further generate control signals to adjust, change, and/or control the current power state of network devices 702A, 702B, 718, PDU/MDUs 705A, 705B, power nodes 706A, 706B, and/or access point 710. The interfaces 902, 904 and/or processing system 906 can generate output signals to provide haptic, tactile, and/or visual feedback of the adjusted, changed, and/or controlled power state to an end-user, network devices 702A, 702B, 718, PDU/MDUs 705A, 705B, power nodes 706A, 706B, and/or access point 710. Using the interfaces 902, 904 and/or processing system 906, network devices 702A, 702B, 718, PDU/MDUs 705A, 705B, power nodes 706A, 706B, and/or access point 710 can shed the isolated and/or tagged network data and/or network loads using a switching-off (or shutting-down) function of the power nodes 706A, 706B and/or the idle mode (or standby, artificial sleep, low-energy mode, hibernating mode, etc.) of the power nodes 706A, 706B and/or can instruct PDU/MDUs 705A, 705B, power nodes 706A, 706B, and/or access point 710 to "drop" the isolated and/or tagged network data and/or network loads.

Alternate embodiments apply principles of the invention during normal runtime operation of a device, such as a UPS. At this time, management software may enforce an artificial sleep, on some currently unutilized equipment in order to, for example, save power. When the equipment is needed, the management software commands power to be applied to the equipment again. A group of rules may be created and/or maintained which may be used to locate unneeded and/or underutilized equipment and/or apply/remove power on such equipment until needed. These rules and procedures may use the same mechanisms as described above.

One of many benefits of such embodiments, allows servers which are not running constantly to be unpowered when they are only needed a small percentage of the time. This has the effect of saving energy in both direct power to the devices and in indirect power such as to provide cooling for these devices.

Figure 8:
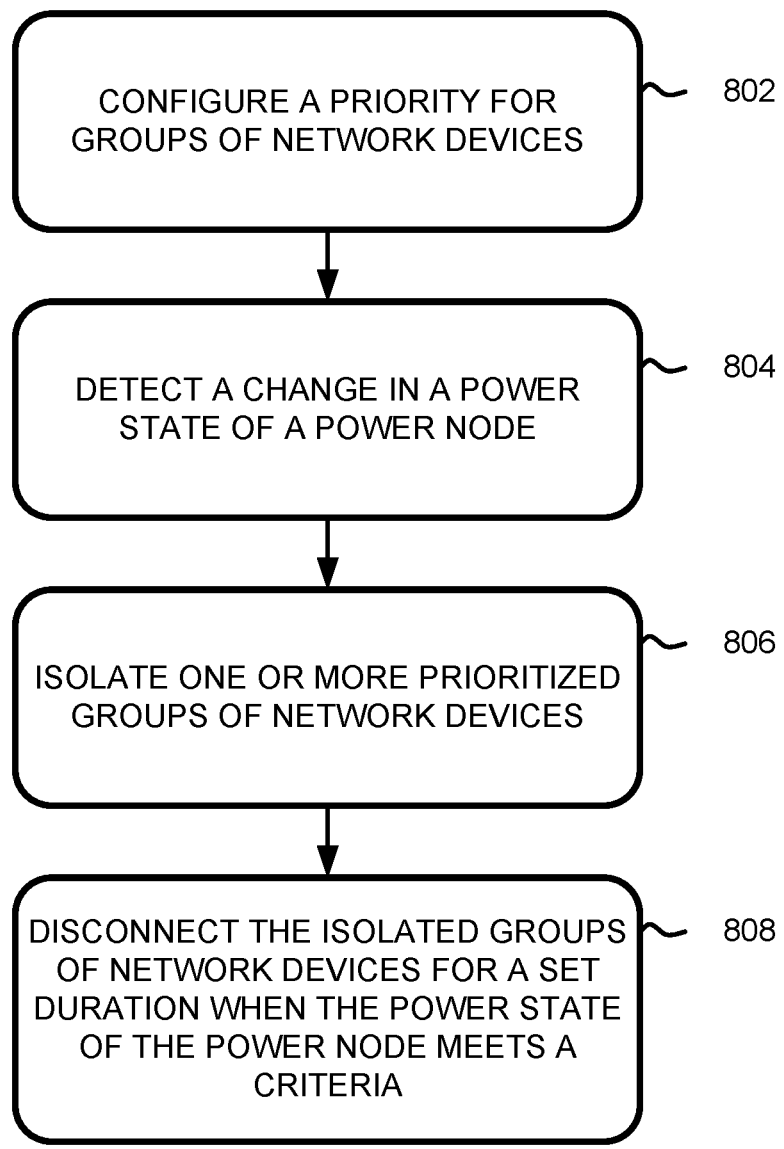
FIG. 8 is a flow diagram depicting a method for power state management at a network node in accordance with an exemplary embodiment of the present disclosure.

With reference now to FIG. 8, a flow diagram of an exemplary method for power state management at a network node is depicted. The method can be implemented in the exemplary network system 100 shown in FIGS. 1A and 1B, the exemplary network system 700 shown in FIG. 7, or with any suitable network system. The method for power state management shown in FIG. 8 is discussed with reference to the network system 700 shown in FIG. 7. In addition, while FIG. 8 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At steps 802-808, a priority may be configured for a group of network nodes and used to disconnect network nodes for a set duration when a power state of the power node meets a set criteria. For example, in one embodiment, multiple network devices 702A, 702B (e.g., a datacenter, server farm, remote terminal unit, computing platform, and/or other internet access device, etc.), 718 may be located at a facility (not shown) and supported by PDU/MDUs 705A, 705B, power nodes 706A, 706B, and/or access point 710. In one embodiment, network devices 702A may be supported by PDU/MDU 705A and/or power node 706A and network devices 702B may be supported by PDU/MDU 706A and/or power node 706B. Network devices 702A can include, for example, three servers: (1) configured to run the network and/or mail server for the facility; (2) configured to manage environmental controls and/or security systems for the facility; and (3) configured to perform on-demand internal development testing for the facility. Network devices 702B can include, for example, five servers: (1) configured to manage a database server that hosts a website of the facility; (2)-(4) configured to host and/or manage redundant copies of the website hosted at the database server; and (5) configured distribute loads (e.g., load-balancer) across the redundant servers (2)-(4). On configuration, an end-user can implement a pairing process and, using an interface 902, 904 and/or SmartConnect application hosted at network devices 702A, 702B, 718, migrate a management wizard and a unique identifier to each of the servers of the network devices 702A, 702B. Using the unique identifiers, the network devices 702, 702B, 718, PDU/MDUs 705A, 705B, power nodes 706A, 706B, and/or access point 710 can validate (e.g., using a key generated based on the unique identifier, etc.) the servers of the network devices 702A, 702B. On validation, the servers of the network devices 702A, 702B may be added to a graphical user interface (GUI) of, for example, network device 718. An end-user can configure a layout of the servers of the network devices 702A, 702B using the GUI. In particular, an end-user can create associations between the servers of the network devices 702A, 702B and PDU/MDUs 705A, 705B, power nodes 706A, 706B, and/or access point 710.

If PDU/MDUs 705A, 705B, power nodes 706A, 706B, and/or access point 710 are supporting (or include) critical servers of the network devices 702A, 702B operating during a configured critical usage window, the end-user (e.g., via an interface 902, 904 and/or SmartConnect application) can instruct power nodes 706A, 706B to continue to provide regulated, uninterrupted power to PDU/MDUs 705A, 705B (e.g., including PDU/MDU outlets) and/or access point 710 and the supported servers of the network devices 702A, 702B for a duration of the configured critical usage window.

For example, in one embodiment, servers (1) and (2), supported by network devices 702A, and servers (4) and (8), supported by network devices 702B, may be designated as critical servers. Server (3), supported by network devices 702A, may be designated as a non-critical server and servers (5)-(7), supported by network devices 702B, may be designated as redundant servers. In other words, at step 802, servers (1) and (2) may be assigned critical priority tags, server (3) may be assigned a non-critical priority tag, and servers (5)-(7) may be assigned redundant priority tags. For those servers (5)-(7) assigned redundant priority tags, an end-user can configure the servers (5)-(7) as a redundant group and specify (e.g., via an interface 902, 904 and/or SmartConnect application) that only a single server of the redundant group of servers (5)-(7) needs to be in an "on," "idle," and/or "active" state during a critical usage window. The end-user can further specify that the network data of each server in the redundant group of servers (5)-(7) be measured using, for example, CPU usage and/or a number of open connections, and that a threshold for assignment of a critical priority tag to a server (5)-(7) in the redundant group of servers be greater than, for example, 85 percent for at least one minute. In one embodiment, the end-user configures a grace period for the critical, non-critical, and/or redundant group of servers such that on detection of a change in and/or current power state of network devices 702A, 702B, PDU/MDUs 705A, 705B, power nodes 706A, 706B, access point 710, and/or input power source 738 and, depending on a current operating mode (e.g., manual or automatic), network devices 702A, 702B, PDU/MDUs 705A, 705B, power nodes 706A, 706B, and/or access point 710 delays shedding of the critical, non-critical and/or redundant servers for a set duration (e.g., milliseconds, seconds, minutes, hours, days, etc.).

At step 804, network devices 702A, 702B, PDU/MDUs 705A, 705B, power nodes 706A, 706B, access point 710, and/or network node 716 can detect a change in and/or a current power state of, for example, PDU/MDUs 705A, 705B (including PDU/MDU outlets), power nodes 706A, 706B, access point 710, and/or input power source 738. For example, power nodes 706A, 706B can receive (or fail to receive) signals at an interface 902, 904 and/or processing system 906 from PDU/MDUs 705A, 705B, access point 710, and/or input power source 738 and use the signals (or lack thereof) to detect loss of: input power source 738, PDU/MDUs 705A, 705B (e.g., including PDU/MDU outlets), power nodes 706A, 706B, and/or access point 710. On detection of loss, PDU/MDUs 705A, 705B (e.g., including PDU/MDU outlets), power nodes 706A, 706B, and/or access point 710 can engage and/or control functions of the power nodes 706A, 706B. For example, PDU/MDUs 705A, 705B, power nodes 706A, 706B, and/or access point 710 can engage a discharging function of battery modules to provide regulated, uninterrupted power to servers (1)-(8) supported by network devices 702A, 702B operating in a configured critical usage window.

At steps 806 and 808, after the configured grace period for the critical, non-critical, and/or redundant group of servers (1)-(8) has expired, the end-user (e.g., via an interface 902, 904 and/or SmartConnect application) can instruct power nodes 706A, 706B to continue to engage the discharging function of the battery modules to provide regulated, uninterrupted power to PDU/MDUs 705A, 705B (e.g., including PDU/MDU outlets) and/or access point 710 and the servers (1), (2), (4), and (8) assigned a critical priority tag, which servers are supported network devices 702A, 702B, for a duration of the configured critical usage window. Further, the end-user (e.g., via an interface 902, 904 and/or SmartConnect application) can instruct power nodes 706A, 706B to shed (or suspend power to) PDU/MDUs 705A, 705B (e.g., including PDU/MDU outlets) and/or access point 710 and supported servers (3) and (5)-(7) assigned non-critical and/or redundant priority tags using a switching-off (or shutting-down) function of the power nodes 706A, 706B and/or the idle mode (or standby, artificial sleep, low-energy mode, hibernating mode, etc.) and/or can instruct power nodes 706A, 706B to "drop" PDU/MDUs 705A, 705B (e.g., including PDU/MDU outlets) and/or access points 710 and the supported servers (3) and (5)-(7) until one or more of the servers (3) and (5)-(7), network devices 702A, 702B, PDU/MDUs 705A, 705B (e.g., including PDU/MDU outlets), and/or access point 710 enters a configured critical usage window. The shedding of supported servers (3) and (5)-(7) can be done simultaneously or staggered at set time intervals.

FIG. 9 illustrates an exemplary processing node 900 in a network system. Processing node 900 can include a communication interface 902, user interface 904, and processing system 906 in communication with communication interface 902 and user interface 904. Processing system 906 includes storage 908, which can comprise a disk drive, flash drive, memory circuitry, or other memory device. Storage 908 can store software 910, which is used in the operation of processing node 900. Storage 908 includes a disk drive, flash drive, data storage circuitry, or some other memory apparatus. Software 910 can include computer programs, firmware, or some other form of machine-readable instructions, including an operating system, utilities, drivers, network interfaces, applications, or some other type of software. Processing system 906 can include a microprocessor and other circuitry to retrieve and execute software 910 from storage 908. Processing node 900 can further include other components such as a power management unit, a control interface unit, etc., which are omitted for clarity. Communication interface 902 permits processing node 900 to communicate with other network elements. User interface 904 permits the configuration and control of the operation of processing node 900.

Examples of processing node 900 can include network nodes 116, 716, access points 110, 112, 710, PDU/MDUs 105A, 105B, 705A, 705B, power nodes 106, 108, 706A, 706B, UPS modules 106A-106N, battery module 140A-140N, control module 142, and/or conventional power supply modules 136A-136N. Processing node 900 can also be a component of a network element, such as a component of network nodes 116, 716, access points 110, 112, router 710, PDU/MDUs 105A, 105B, 705A, 705B, power nodes 106, 108, 706A, 706B, UPS modules 106A-106N, battery module 140A-140N, control module 142, and/or conventional power supply modules 136A-136N. Processing node 900 can also be another network element in a network system. Further, the functionality of processing node 900 can be distributed over multiple network elements of the network system.

The exemplary methods and systems described can be performed under the control of a processing system executing computer-readable codes embodied on a computer-readable recording medium or signals sent through a transitory medium. The computer-readable recording medium can be any data storage device that can store data readable by a processing system and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The signals transmitted through a transitory medium may include, for example, modulated signals transmitted through wired or wireless transmission paths.

The invention claimed is:

1. A non-transitory computer-readable medium storing thereon sequences of compuer-executale instructions for managing power at a power node, the sequences of comptuer-readable instructions including instructions that instruct at least one processor to:
  confgre a priority for a plurality of network nodes connected to a gateway node based on a parameter and monitor network data at the plurality of network nodes;
  monitor a current power state of the power node, the power node being connected to the gateway node and configured to operate in a first and/or second mode of operation; and
  disconnect, after a grace period expires, at least one network node of the plurality of network nodes when the current power state of the power node meets a first criteria and the configured priority of the at least one network node meets a second criteria.

2. The non-transitory computer-readable medium of claim 1, wherein the gateway node is a Power Distribution Unit (PDU) and/or Mains Distribution Unit (MDU) configured to support the plurality of network nodes.

3. The non-transitory computer-readable medium of claim 2, wherein monitor network data includes query, at set time intervals, network data at the plurality of network nodes;
  and assign priority, at the POU/MDU, to the plurality of network nodes based on results of deep packet inspection applied to each of the plurality of network nodes.

4. The non-transitory computer-readable medium of claim 1, wherein the parameter is an assigned tag.

5. The non-transitory computer-readable medium of claim 4, wherein the assigned tag is at least one of:
  a low priority tag, medium priority tag, high priority tag, redundant tag, critical tag, and/or non-critical tag.

6. The non-transitory computer-readable medium of claim 1, wherein the sequences of computer-executable instructions further include instructions that instruct at least one processor to:
  generate, using machine-learning, numerical gradients for the power node, gateway node, and/or at least one network node using the parameter; and
  calculate a criticality for each of the generated numerical gradients; and when the calculated criticality exceeds a threshold probability,
  disconnect at least one network device.

7. The non-transitory computer-readable medium of claim 1, wherein the current power state is at least one of: utility mains available, utility mains unavailable, and/or utility mains unreliable.

8. The non-transitory computer-readable medium of claim 1, wherein the power node includes an uninterruptible power supply (UPS).

9. The non-transitory computer-readable medium of claim 1, wherein the first mode of operation is a manual mode of operation.

10. The non-transitory computer-readable medium of claim 9, wherein the second mode of operation is an automatic mode of operation.

11. The non-transitory computer-readable medium of claim 10, wherein the power node is configured to switch between the first mode of operation and the second mode of operation.

12. A network system, comprising:
  an uninterruptible power supply (UPS) configured to be coupled to a router, the UPS further configured to:
    collect network data associated with network devices from the router at set time intervals, including network usage status;
    configure, based on the collected network data including the network usage status, a priority for the network devices;
    provide backup power to the network devices when a power state of the router meets a first criteria and the network data meets a second criteria; and
    disconnect network devices classified as non-critical for a set duration when the power state meets the first criteria.

13. The network system of claim 12, further comprising the router, and wherein the router is configured to communicate with a user interface and the UPS.

14. The network system of claim 12, wherein collect network data includes collecting network data based on results of deep packet inspection.

15. The network system of claim 12, wherein the first criteria of the power state of the router is one of utility mains unavailable and utility mains unreliable.

16. A method for power management at a power node, the method. comprising:
  configuring, at a control node, a priority for a plurality of network nodes connected to a gateway node based on a parameter; wherein configuring includes monitoring network data at the plurality of network nodes;
  monitoring, at the control node, a current power state of the power node, the power node being connected to the gateway node and configured to operate in a first and/or second mode of operation; and
  disconnecting, after a grace period expires, at least one network node of the plurality of network nodes when the current power state of the power node meets a first criteria and the configured priority of the at least one network node meets a second criteria.

17. The method of claim 16, wherein the gateway node includes a Power Distribution Unit (PDU) and/or Mains Distribution Unit (MDU) configured to support the plurality of network nodes.

18. The method of claim 16, wherein the power node includes an uninterruptible power supply (UPS).

\* \* \* \* \*